US012811775B2

(12) United States Patent
Macchetti et al.

(10) Patent No.: US 12,811,775 B2
(45) Date of Patent: Nov. 24, 2026

(54) METHODS, UNIT AND DEVICE FOR CONCURRENTLY EXECUTING FIRST AND SECOND BLOCK CRYPTOGRAPHIC COMPUTATIONS

(71) Applicant: NAGRAVISION SARL, Cheseaux-sur-Lausanne (CH)

(72) Inventors: Marco Macchetti, Cheseaux-sur-Lausanne (CH); Hervé Pelletier, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 117 days.

(21) Appl. No.: 18/779,694

(22) Filed: Jul. 22, 2024

(65) Prior Publication Data

US 2025/0038950 A1 Jan. 30, 2025

(30) Foreign Application Priority Data

Jul. 25, 2023 (EP) .................................... 23187594

(51) Int. Cl.

*H04L 29/06* (2006.01)
*G06F 21/00* (2013.01)
*H04L 9/06* (2006.01)
*H04L 9/14* (2006.01)

(52) U.S. Cl.

CPC .............. *H04L 9/0618* (2013.01); *H04L 9/14* (2013.01)

(58) Field of Classification Search

CPC ..... H04L 9/0618; H04L 9/14; H04L 2209/04; H04L 2209/08; H04L 2209/125; H04L 2209/24; H04L 9/0625; H04L 9/0631; H04L 9/003

See application file for complete search history.

(56) References Cited

U.S. PATENT DOCUMENTS

| | | | | |
|---|---|---|---|---|
| 2011/0280394 | A1* | 11/2011 | Hoover | H04L 9/0618 380/28 |
| 2016/0352509 | A1* | 12/2016 | Wu | G09C 1/00 |
| 2020/0244434 | A1 | 7/2020 | Pedersen | |
| 2021/0184830 | A1* | 6/2021 | Satpathy | H04L 9/002 |

(Continued)

FOREIGN PATENT DOCUMENTS

KR 20080096356 * 10/2008

OTHER PUBLICATIONS

Codabux-Rossan et al., AES CC<P Algorithm with N-Way Interleaved Cipher Block Chaining, Oct. 2009, U Iversity of Mauritius Research Jour Al â vol. 15 â 2009, pp. 527-541 (Year: 2009).*

(Continued)

*Primary Examiner* — Lisa C Lewis
(74) *Attorney, Agent, or Firm* — POLSINELLI LLP

(57) ABSTRACT

A method for concurrently executing a first block cryptographic computation (60) and a second block cryptographic computation (61) using a ciphering circuit. The first block cryptographic computation includes computing a first output block (42) by executing a plurality of first processing rounds (70*i*, 78) based on a first input block (38, 64), and the second block cryptographic computation includes computing a second output block (43) by executing a plurality of second processing rounds (75*j*, 79) based on a second input block (39, 65). The method further includes alternatingly executing respective first and second processing rounds in a round-interleaved sequence.

20 Claims, 7 Drawing Sheets

(56) References Cited

U.S. PATENT DOCUMENTS

| | | | | |
|---|---|---|---|---|
| 2021/0279341 | A1 * | 9/2021 | Huck | H04L 9/0656 |
| 2022/0191004 | A1 * | 6/2022 | Sasdrich | H04L 9/003 |
| 2023/0362630 | A1 * | 11/2023 | Gill | H04W 4/14 |

OTHER PUBLICATIONS

Socha Petr et al: "Side-channel countermeasures utilizing dynamic logic reconfiguration: Protecting AES/Rijndael and Serpent encryption in hardware", Microprocessors and Microsystems, IPC Business Press Ltd. London, GB, vol. 78, Aug. 3, 2020; 17 pages.
Macchetti Marco et al: "A New Fast and Side-Channel Resistant AES Hardware Architecture", 2023 IEEE International Conference on Cyber Security and Resilience (CSR), IEEE, Jul. 31, 2023; 8 pages.
European Extended Search Report dated Dec. 14, 2023 for EP Application No. 23187594.9; 8 pages.

* cited by examiner

METHODS, UNIT AND DEVICE FOR CONCURRENTLY EXECUTING FIRST AND SECOND BLOCK CRYPTOGRAPHIC COMPUTATIONS

CROSS REFERENCE TO RELATED APPLICATIONS FILED

This application claims the benefit to EP patent application Ser. No. 23/187,594.9 filed Jul. 25, 2023, which is hereby incorporated by reference, in entirety and for all purposes.

TECHNICAL FIELD

The invention relates to methods for concurrently executing a first block cryptographic computation and a second block cryptographic computation using a ciphering circuit. The invention further relates to a ciphering processor unit and an electronic device configured to execute such a method, as well as to a machine-readable medium holding instructions for performing such a method.

BACKGROUND ART

The Advanced Encryption Standard (AES) is a ciphering scheme belonging to the class of block ciphers that are based on iterated substitution-permutation networks (SPNs). A "cipher" refers to an algorithm for performing encryption or decryption. In cryptography, a "block cipher" is a deterministic algorithm operating on fixed-length groups of bits, called "blocks". AES operates on fixed-sized blocks with a size of 128 bits, which are iteratively combined with keys having possible key sizes of 128, 192 or 256 bits. The data that is to be encrypted (or decrypted) by AES is transformed into a ciphertext (or a plaintext) by iteratively applying a predetermined number of operations called "rounds".

During the last twenty years, the AES algorithm has been widely adopted and ubiquitously deployed to protect sensitive data across a multitude of systems and platforms, for Internet-of-Things (IoT) and cybersecurity markets. Nowadays, AES is implemented in a variety of hardware and software combinations, ranging from dedicated instructions of modern processors, to embedded hardware/software such as secure elements and Roots-of-Trust platforms, to fast hardware variants in system-on-chip (SoC), field-programmable gate arrays (FPGAs) and dedicated application-specific integrated circuits (ASICs).

Hardware implementations of cryptosystems are susceptible to side channel attacks. Side channel attacks are passive physical attacks in which various forms of signal leakage from the operational hardware (in particular electromagnetic leaks, such as current absorption, electromagnetic emissions, etc) are intercepted and analysed in order to gain insight into the functioning of the hardware and to find ways to compromise the ciphering keys.

Considerable efforts have been spent by the research community to investigate the resistance of AES and similar iterative block ciphering methods against physical attacks, and to devise various protection strategies to improve the resistance of block ciphering methods and circuits against side-channel analysis. Many of the protection solutions that have been developed thus far come with a considerable increase of the circuit complexity and/or a performance degradation of the ciphering algorithm.

It would be desirable to obtain block ciphering software and hardware which provides good resistance against side channel attacks while avoiding an excessive reduction of ciphering performance and/or an increase in circuit surface footprint.

SUMMARY OF INVENTION

Therefore, according to a first aspect, there is provided a method for concurrently executing a first block cryptographic computation and a second block cryptographic computation using a ciphering circuit. The first block cryptographic computation includes computing a first output block by executing a plurality of first processing rounds based on a first input block. The second block cryptographic computation includes computing a second output block by executing a plurality of second processing rounds based on a second input block. The method further includes alternatingly executing respective first and second processing rounds in a round-interleaved sequence. In this round-interleaved sequence, a respective second processing round may follow a respective first processing round and may be followed by a respective next first processing round, etc.

As a result of the concurrent execution of the two ciphering computations and interleaving (i.e. placing between each other) respective rounds of these ciphering computations, the dynamic leakage associated with data signals moving through the combinational logic components during the ciphering computations is reduced or even eliminated. The resistance of the ciphering circuit against first-order side channel analysis is thus improved. Preferably, instances of the rounds associated with the first and second ciphering computations are interleaved in a strictly alternating manner. In this case, one respective round of the first computation is always followed directly by one respective round of the second computation, and vice versa.

The first input block may for instance contain random input data, such as data obtained from a (pseudo-) random number generator or other entropy source, which optionally may be further modified by a first initial round key. The second input block may contain target input data, such as plaintext or ciphertext data, which optionally may be further modified by a second initial round key. Intermediate results obtained from processing rounds of the random cryptographic computation propagate through the combinational logic of the ciphering circuit while being interleaved with intermediate results obtained from processing rounds of the target cryptographic computation involving actual plaintext or ciphertext data. Each move of a random result through the combinatorial cells of the ciphering circuit removes previous state information from these cells, thereby decreasing the signal-to-noise ratio (SNR) associated with potential leakage of actual signal values coming from the combinational logic (due to glitches, early propagation, etc). In addition, if the first input block is a (pseudo-) random data block, the end of a complete random computation will yield a fresh output block which is usable as random input for a following random cryptographic computation. Alternatively or in addition, this fresh random output block may be used in other operations executed within the ciphering circuit or elsewhere in the ciphering processor unit. The self-sustaining generation of random output blocks with each random cryptographic computation obviates the need for providing a dedicated pseudo-random number generator (PRNG) and associated increased footprint of the ciphering unit.

According to an embodiment, the first and second block cryptographic computations are iterated block cryptographic computations in which respective first and second intermediate blocks are obtained in an alternating sequence. In this case, the method may further include obtaining a plurality of first intermediate blocks and a plurality of second intermediate blocks. Each of the first intermediate blocks results from a corresponding first processing round and forms an input for a next first processing round. Similarly, each of the second intermediate blocks results from a corresponding second processing round and forms an input for a next second processing round. The ciphering circuit obtains respective first and second intermediate blocks in an alternating sequence.

In an iterated block cipher, the input block is subjected to multiple rounds of processing, with each round applying the same overall transformation function to the incoming block (although the applied transformation may differ with regard to distinct keys that may be combined with the intermediate blocks during each round). Using the intermediate block resulting from one processing round as input for the next processing round allows obtaining a high diffusion and strong tamper resistance for the blocks of output data obtained by the cryptographic computations, and in particular for the output data obtained by the target computation based on plaintext or ciphertext input data.

In a further embodiment, the ciphering circuit includes a first block register and a second block register. The block registers are configured to cooperate as a shift register and to store at least two blocks of data obtained during the processing rounds. This method embodiment further includes alternatingly storing obtained first and second intermediate blocks in the first block register while moving a preceding second or first intermediate block into the second block register so that subsequent first and second intermediate blocks are moved in an interleaved sequence through the shift register.

In this case, method may further include:

i) initially storing the first input block in the second block register and concurrently storing the second input block in the first block register;

ii) processing the first input block to obtain a first intermediate block, shifting the second input block to the second block register, and storing the first intermediate block in the first block register, and iii) processing the second input block to obtain a second intermediate block, shifting the first intermediate block to the second block register, and storing the second intermediate block in the first block register.

Using a block shift register (or "double-state pipeline") for alternatingly storing and moving blocks obtained during the processing rounds of the two distinct cryptographic computations provides a convenient way to implement the round-interleaving of the two computations, and renders it unnecessary to duplicate the combinatorial logic of the ciphering circuit. The interleaved shifting of blocks from the two computations through the shift register efficiently removes previous state information from the two parts of the register, thereby yielding a considerable reduction or even elimination of transition leakage from this register.

According to embodiments, the method further includes:

storing the first output block obtained from the first block cryptographic computation, and executing a next third block cryptographic computation including third processing rounds concurrently with a fourth block cryptographic computation including fourth processing rounds. The first output block is stored and the next cryptographic computations are executed after the first and second block cryptographic computations have completed. In this case, the respective third and fourth processing rounds may be executed in an alternating fashion during a further round-interleaved sequence. The third block cryptographic computation may then involve using the first output block as third input block for computing a third output block.

If the first input block is a random data block, then the random computation will yield a fresh output block which may be used as random input for a next random cryptographic computation. The self-sustaining generation of random output blocks with each random cryptographic computation obviates the need for providing a dedicated PRNG component in the ciphering unit.

According to embodiments, the first and second block cryptographic computations are iterated key-alternating block cryptographic computations. In this case, the method may further include concurrently executing a first key scheduling operation and a second key scheduling operation using a scheduling circuit. The first key scheduling operation involves partitioning or expanding a first input key into first round keys by iteratively executing a plurality of first key processing cycles. The second key scheduling operation involves partitioning or expanding a second input key into second round keys by iteratively executing a plurality of second key processing cycles. In this case, the method may further comprise alternatingly executing respective first and second key processing cycles in a cycle-interleaved sequence.

The first input key may for instance be an (externally unknown) random key, whereas the second input key may be a (user supplied or agreed) symmetric key.

In a key-alternating block cipher, each processing round of a block cipher computation applies an overall transformation that achieves diffusion of the elements in the block, whereas each round further includes the application of a round key to the entire block. The round keys may be produced from an initial master key through a sequence of key scheduling cycles executed by a key scheduling circuit. The interleaving technique used for the cipher processing rounds may similarly be implemented for the key scheduling cycles, thereby improving the resistance of the key scheduling circuit against first-order side channel analysis.

In a further embodiment, respective first and second key processing cycles yield corresponding first and second round keys. In this case, the method may further include synchronizing the round-interleaved and cycle-interleaved sequences, by letting the scheduling circuit supply a respective first round key to the ciphering circuit during a respective first processing round as partial input for obtaining a corresponding first intermediate block, and letting the scheduling circuit supply a respective second round key to the ciphering circuit during a respective second processing round as partial input for obtaining a corresponding second intermediate block. The respective first round keys may be supplied to the ciphering circuit via respective round key addition operations using a key adder, and the respective second round keys may be supplied to the ciphering circuit via corresponding further round key addition operations using the same key adder.

According to embodiments, the scheduling circuit includes a first key register and a second key register configured to cooperate as a key shift register. The first and second key registers are configured to store at least two round keys. This method embodiment further includes alternatingly storing obtained first and second round keys in the first key register while moving a preceding second or first round key into the second key register so that subsequent first and second round keys move in an interleaved sequence through the key shift register.

In this case, the method may further include:

i) initially storing the first input key in the second key register and concurrently storing the second input key in the first key register;

ii) processing the first input key with the scheduling circuit to obtain a first round key, shifting the second input key to the second key register, and storing the first round key in the first key register, and iii) processing the second input key with the scheduling circuit to obtain a second round key, shifting the first round key to the second key register, and storing the second round key in the first key register.

Providing the key shift register (pipeline) for alternatingly storing and moving round keys obtained during the cycles of the two distinct key scheduling operations provides a convenient way to implement the cycle-interleaving of the two operations and the temporary storing of intermediate round keys, obviates the need to duplicate the combinatorial logic of the key scheduling circuit. In AES key scheduling, the round keys are expanded from the master key, and the contents of a round key obtained by one expansion cycle is used as input of a next expansion cycle for obtaining a next round key. The interleaved storing and shifting of round keys from two expansion operations efficiently removes previous key information from each part of the key register, thereby reducing or even elimination transition leakage.

In further embodiments, the method includes, after completing the first and second key scheduling operations:

storing a first final round key obtained from a final first key processing cycle of the first key scheduling operation, and executing a third key scheduling operation that includes third key processing cycles concurrently with a fourth key scheduling operation that includes fourth key processing cycles, wherein respective third and fourth key processing cycles are alternatingly executed in a further cycle-interleaved sequence.

In this case, the third key scheduling operation may include using the first final round key as third input key for partitioning or expanding into third round keys.

Both random values of the first input block in the first cryptographic computation and the random input key in the first key scheduling operation are assumed to be unknown to a potential attacker, and to be changing in-between subsequent computations and operations. The random cryptographic computation and random key scheduling operation will yield fresh a random output block and random output key, which may be used as random inputs for the next computation and scheduling. The self-sustaining generation of random output with each random computation and key scheduling obviates renders it unnecessary to provide a separate PRNG component in the ciphering unit.

In embodiments wherein the third block cryptographic computation uses the first output block as third input block, the method may further include implementing a functional correspondence between input and output of non-linear transformations applied by the ciphering circuit on the first input block during the first block cryptographic computation, and applying dynamical obfuscation to the ciphering circuit. The dynamical obfuscation may involve:

selecting, based on contents of the first output block and/or of a first intermediate block produced by the first block cryptographic computation, a subset of the functional correspondences, and re-encoding the functional correspondence into a modified functional correspondence between the input and the output of the non-linear transformations applied on the third input block during the third block cryptographic computation.

The functional input-output correspondences may for instance be changed by randomly permutating or swapping elements in encoding tables in-between subsequent cryptographic computations. By changing the functional input-output correspondences based on changing random data that is internally generated, the logic obfuscation is accomplished in a dynamic fashion that is gradually changing during subsequent computations and is highly unpredictable for a potential attacker.

According to method embodiments, the first and second block cryptographic computations are iterated key-alternating block cryptographic computations in accordance with AES. In such computations, each of the first and second input blocks and the first and second output blocks forms a two-dimensional state array that is composed of data elements, with each element having a size of one byte. Each round of at least part of the first and second processing rounds may then involve a byte substitution operation, a row shifting operation, a column mixing operation, and a round key addition operation.

The proposed concurrent cipher computation method with interleaved processing rounds is efficiently applied to the widely adopted AES ciphering algorithm, and allows a highly portable register-transfer level (RTL) description that is capable of being easily targeted to FPGA and ASIC technologies.

In a further embodiment, the method may further include the application of dynamic obfuscation in the byte substitution operation, and the application of Boolean masking in the row shifting operation, in the column mixing operation, and in the round key addition operation.

The application of dynamic obfuscation and Boolean masking allows protecting the non-linear and linear parts of the AES computation with a good efficiency and at relatively low implementation costs. Combining the interleaving of concurrent AES computations with the dynamic obfuscation in the byte substitution operation and Boolean masking in other operations within each individual AES computation yields a high overall resistance to first-order side channel analysis, thus obtaining a favourable balance between circuit size, calculation speed, and security performance.

Preferably, the functional correspondences and subsequently modified functional correspondences are applied between the input signals and output signals propagating in an n-bit finite field arithmetic component for executing the byte substitution operation in AES block cryptographic computations.

The n-bit finite field arithmetic component may include a multiplicative inversion subcomponent, such as a Galois field byte inversion circuit composed of a plurality of interconnected subfield operators. The Galois field byte inversion circuit may for instance have a circuit architecture based on one of a Canright implementation operating on a normal basis subfield (see e.g. [ref. 2]), a Satoh implementation operating on a polynomial basis subfield (see e.g. [ref. 3]), and a Nogami implementation operating on a mixed basis subfield (see e.g. [ref 4]). Furthermore, the modified functional correspondences may be applied only to the multiplicative inversion subcomponent.

Dynamically modifying the functional input-output correspondences of the sub-field operators within an n-bit finite field arithmetic component of the AES ciphering circuit allows a circuit architecture that is easy to implement, and which efficiently reduces dynamic leakage associated with correlations between subsequent input values and switching events occurring within this non-linear component during ciphering computations.

According to a second aspect of the invention, and in accordance with the advantages and effects described herein above, there is provided a ciphering processor unit which includes the ciphering circuit and is configured to execute the method according to the first aspect.

The ciphering processor unit may be configured to be selectively operated in one of at least two modes, these modes including an enciphering mode and a deciphering mode. In the enciphering mode, the first and second block cryptographic computations include concurrently encrypting the first and second input blocks. In the deciphering mode, the first and second block cryptographic computations include concurrently decrypting the first and second input blocks.

In an embodiment, the ciphering processor unit includes the first and second block registers and is configured to execute one or more of the method embodiments involving the block registers.

In embodiments, the ciphering processor unit includes the key scheduling circuit and the first and second key registers, and is configured to execute one or more of the method embodiments involving the key registers.

According to a third aspect of the invention, and in accordance with the advantages and effects described herein above, there is provided an electronic device including a ciphering processor unit in accordance with the second aspect. This electronic device may be one of: a wireless communication device, an Internet of Things device, an application-specific integrated circuit provided with cryptographic capability (such as the chip in a smartcard), or a field-programmable gate array circuit component with cryptographic capability.

According to a fourth aspect of the invention, there is provided a machine-readable medium that stores instructions for performing a method according to the first aspect, when loaded on and executed by a processing unit.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements. Multiple instances of an element may each include separate labels appended to the reference number (for instance "35*a*" and "35*b*"). The reference number may be used without an appended label (e.g. "35") to generally refer to an unspecified instance or to all instances of that element.

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures.

Figure 1:
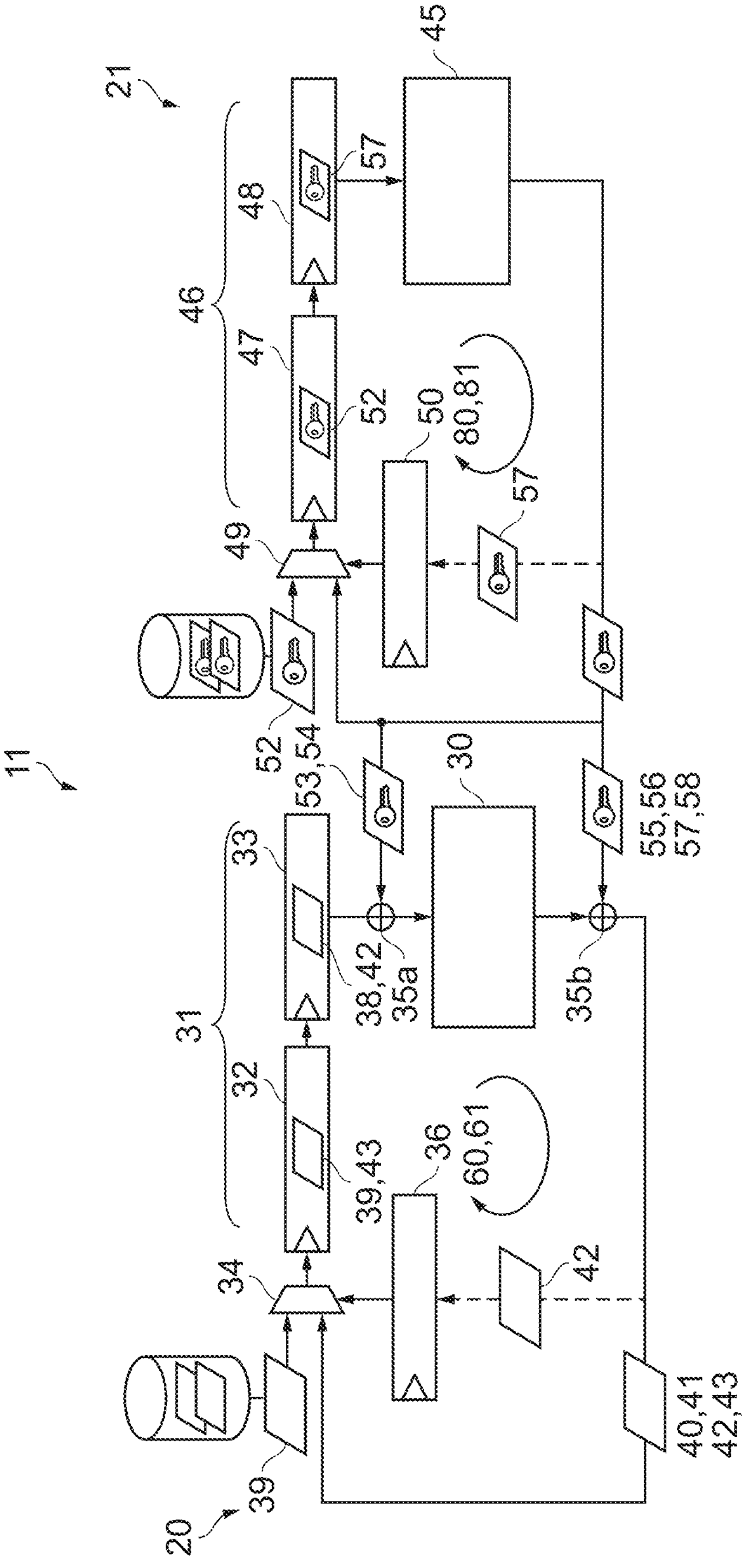
FIG. 1 schematically shows a ciphering unit according to an embodiment.

FIG. 1 schematically shows an exemplary ciphering unit 11 provided with a ciphering circuit 20 and a key scheduling circuit 21 for implementing a cipher computation method according to the first aspect of the present invention. The ciphering computation method involves concurrent execution of first and second block cryptographic computations 60, 61 using the ciphering circuit 20. The exemplary ciphering computation method in FIG. 1 further involves concurrent execution of first and second key scheduling operations 80, 81 using the key scheduling circuit 21.

The ciphering circuit 20 comprises round logic 30, a block shift register 31, a block input multiplexer 34, key adders 35*a-b*, and a third block register 36. The key scheduling circuit 21 comprises key scheduling logic 45, a key shift register 46, a key input multiplexer 49, and a third key register 50.

The block shift register 31 is composed of a first block register 32 and a second block register 33, which are placed in sequence and are configured to operate as a pipeline for temporarily storing and intermittently shifting two blocks of data representing the initial, intermediate, and/or final states produced during the two concurrent cryptographic computations 60, 61.

The key shift register 46 is composed of a first key register 47 and a second key register 48, which are placed in sequence and are configured to operate as a further pipeline for temporarily storing and intermittently shifting two blocks of data representing the initial, intermediate, and/or final round keys produced during the two concurrent key scheduling operations 80, 81.

Further details of the components in the ciphering and key scheduling circuits 20, 21 will be explained below.

In the example of FIG. 1, the first and second block cryptographic computations 60, 61 are iterated block cryptographic computations. The first block cryptographic computation 60 includes iteratively computing a plurality of first intermediate blocks 40 as well as a first output block 42, by executing a sequence of first processing rounds that are based on a first input block 38 as initial input. An initial first processing round is based on the first input block 38, and respective subsequent first processing rounds yield corresponding first intermediate blocks 40 that form inputs for next first processing rounds. A final first processing round takes a final first intermediate block 40 as input, and produces the first output block 42.

Similarly, the second block cryptographic computation 61 includes computing a plurality of second intermediate blocks 41 as well as a second output block 43, by executing a sequence of second processing rounds that take a second input block 39 as initial input. An initial second processing round is based on the second input block 39, and respective subsequent second processing rounds yield corresponding second intermediate blocks 41 that form inputs for next second processing rounds. A final second processing round takes a final second intermediate block 41 as input, and produces the second output block 43.

In the approach currently proposed, the individual processing rounds of the first computation 60 are alternated with the individual processing rounds of the second computation 61, such that one first processing round is followed by a second processing round, and then followed by a next first processing round, etc. Hence, the ciphering circuit 20 in configured to interleave the respective first and second rounds, thereby producing respective first and second intermediate blocks 40, 41 in an alternating sequence. Ultimately, the concurrent computations 60, 61 yield the first and second output blocks 42, 43.

Preferably, the two cryptographic computations 60, 61 are being interleaved in such a way that every net in the ciphering circuit 20 always switches from a data block (or signal value) associated with a processing round of the first computation 60, directly to a subsequent data block (or signal value) belonging to the second computation 61, and vice versa. The rounds associated with the first and second computations 60, 61 are then interleaved in a strictly alternating manner, such that none of the nets in the ciphering circuit 20 switches between two data blocks (from subsequent computation rounds) that belong to the same computation. By interleaving the data blocks of the two cryptographic computations 60, 61, the propagation of the signal values belonging to a state associated with a round of one computation through the combinational logic in the ciphering circuit 20 will remove state information associated with a preceding round of the other computation from all the combinatorial cells in the ciphering circuit 20. If the first and second computations 60, 61 are not correlated, then to a first approximation the ciphering circuit 20 will not produce dynamic leakage associated with either of the cryptographic computations 60, 61. "First approximation" refers herein to simple hamming distance leakage between two rounds of one variable holding the state of the cryptographic computation.

In the example of FIG. 1, the first block cryptographic computation 60 takes random values as the first input block 38 (possibly combined with a first input key 51, as discussed herein below), and is herein referred to as a "random block computation". By contrast, the second block cryptographic computation 61 takes actual values (e.g. plaintext data in case of an encryption computation, or encrypted data in case of a decryption computation) as the second input block 39 (possibly combined with a second input key 52, as discussed below), and is herein referred to as a "target block computation". The second input block 39 may be unencrypted data ("plaintext") or previously encrypted data ("cipher text"), and the output block 43 produced by the second computation 61 may then be single or double encrypted cipher text. The input block 39 may be a sub-portion from any computer-readable data, such as a portion of digital video content, image content, audio content, a computer message, a secure transmission, or any other string of values that can be encoded as bits. It is implicit that the computer-readable data is partitioned in advance or on-the-fly into the discrete blocks taken as input by the computations 60, 61.

The interleaving reduces the signal-to-noise ratio (SNR) associated with undesired information leakage of the computed signal values for the target block computation 61, produced by the combinational logic due to timing characteristics of the circuit 20 (e.g. relating to glitches or early propagation).

In addition, a fresh random output block 42 is produced at the end of a complete random block computation 60. This output block 42 may be used as input block 38' for a subsequent random block computation 60'. The ciphering circuit 20 may be configured to execute this subsequent random block computation 60' concurrently with a subsequent target block computation 61', and configured to interleave the block computation rounds of these subsequent computations 60' 61' in the same manner as for the preceding random and target block computations 60, 61.

The generation of random output blocks 42 after completion of each random block computation 60 may be regarded as a pseudo-random number generator (PRNG) function of the ciphering circuit 20, which removes the need to provide a distinct PRNG module in the ciphering unit 11. Only an initial seed is used as a source of randomness for obtaining the initial random input block 38. If the proposed ciphering unit 11 is instantiated as a peripheral in a secure enclave, then a secure CPU may charge a seed from an entropy source during the initial secure boot phase. However, the ciphering circuit 20 subsequently produces pseudo-random signals in a self-sustaining manner, which renders it unnecessary for the secure CPU to refresh the seed again.

In the example of FIG. 1, the first and second block cryptographic computations 60, 61 are iterated key-alternating block cryptographic computations, and the method further includes concurrently executing the first and second key scheduling operations 80, 81 using the scheduling circuit 21.

In a key-alternating block cipher, each processing round of a block cipher computation (e.g. 60 or 61 as such) has its own associated round key, and this round key is XOR-ed with the block or state produced at the end of the processing round. The XOR-operation (i.e. Boolean logic "exclusive OR" operation) acts on two operands formed by sets of multi-bit signal values, with the XOR acting on each corresponding pair of bits in the two operands. In FIG. 1, the adding of the various round keys produced by the scheduling circuit 21 to the states in the ciphering circuit 20 is indicated with the adder symbol @. An initial round key may be XOR-ed with the input block before the first round. The round keys are being obtained by expanding a supplied master key using a key scheduling algorithm.

The first key scheduling operation 80 incudes partitioning or expanding a first input key 51 into a plurality of first round keys 53, 55, 57, by iteratively executing a plurality of first key processing cycles. An initial first key processing cycle is directly based on the input key 51 and yields a first initial round key 53, and respective subsequent first key processing cycles yield corresponding first intermediate round keys 55. A final first key processing cycle produces a first final round key 57.

Similarly, the second key scheduling operation 81 incudes partitioning or expanding a second input key 52 into a plurality of second round keys 54, 56, 58, by iteratively executing a plurality of second key processing cycles. An initial second key processing cycle is directly based on the input key 52 and yields a second initial round key 54, whereas respective subsequent second key processing cycles yield corresponding second intermediate round keys 56. A final second key processing cycle produces a second final round key 58.

In the example of FIG. 1, the ciphering unit 11 is further configured to alternate respective first key processing cycles of the first key scheduling operation 80 with respective second key processing cycles of the second key scheduling operation 81. As a result, the scheduling circuit 21 interleaves the respective first and second cycles, thereby producing respective first and second round keys 53-58 in an alternating sequence.

In the example of FIG. 1, the first key scheduling operation 80 takes a random master key as first input key 51 and is herein referred to as a "random key operation". By contrast, the second key scheduling operation 81 takes an actual master key (e.g. a user-supplied or mutually agreed key) as the second input key 51, and is herein referred to as a "target key operation".

Also in this case, the interleaving reduces the SNR associated with undesired information leakage of the various round keys 53-58 traveling through the combinatorial cells in the scheduling circuit 21 due to timing characteristics of this circuit 21.

In addition, at the end of a complete random key operation 80, a random final round key 57 is produced, which may be used as fresh random input key 51' for a subsequent random key operation 80'. The scheduling circuit 21 may be configured to execute also this subsequent random key operation 80' concurrently with a subsequent target key operation 81', configured to interleave the key scheduling cycles of these subsequent operations 80', 81' in the same manner as in the initial concurrent random and target key operations 80, 81.

The exemplary circuit of FIG. 1 is configured to synchronize the round-interleaving for the concurrent cryptographic computations 60, 61 in the ciphering circuit 20 with the cycle-interleaving for the concurrent key scheduling operations 80, 81 in the scheduling circuit 21. Each of the first and second round keys 53-58 is supplied to the ciphering circuit 20 via an appropriate key adder 35, and at the appropriate time and logical position when the corresponding processing round is executed.

In this example, the first (random) input block 38 is first modified by the first initial round key 53 via the key adder 35*a*, and the resulting modified first input block 64 is then supplied to the round logic 30 for processing. In a similar manner, the second (target/plaintext) input block 39 is first modified by the second initial round key 54 via the key adder 35*a*, and the resulting modified second input block 65 is then supplied to the round logic 30 for processing. In subsequent rounds and cycles, each of the first and second intermediate round keys 55, 56 and first and second final round keys 57, 58 is supplied to the round logic 30 during the appropriate processing round via the other key adder 35*b*. In alternative embodiments, the obtained keys may be added to the appropriate blocks at different physical positions and logical stages during processing rounds.

The random values of the first input block 38 in the first cryptographic computation 60 and the random input key 51 in the first key scheduling operation 80 are assumed to be unknown to a potential attacker, and to be changing in-between subsequent computations and operations. According to the present concept, the PRF property of the random cryptographic computation 60 is used to update these values, starting from an unknown initial seed.

The concurrent execution of the two cryptographic computations 60, 61 with interleaving of the respective subsequent processing rounds is facilitated by the use of the block shift register 31. In a similar way, the concurrent execution of the two key scheduling operations 80, 81 with interleaving of the respective subsequent key processing cycles is facilitated by the use of the key shift register 46.

The block shift register 31 includes the first and second block registers 32, 33, which are interconnected and configured to cooperate as a data pipeline, in which state results formed by initial blocks 38, 39 (or 64, 65), intermediate blocks 40, 41, and final blocks 42, 43 produced by the interleaved rounds of the ciphering computations 60, 61 are stored.

The key shift register 46 includes the first and second key registers 47, 48, which are interconnected and configured to cooperate as a key pipeline, in which the round keys 53-58 produced by the interleaved cycles of the key scheduling operations 80, 81 are stored.

Use of the block and key shifting registers 31, 46 obviates the need to duplicate the combinatorial logic of the ciphering and key scheduling circuits 20, 21 for the two concurrent computations 60, 61 and scheduling operations 80, 81.

In the example of FIG. 1, before the ciphering processing in the round logic 30 commences, the random input block 38 is first supplied to the ciphering circuit 20 via the block input multiplexer 34, and entered into the block shift register 31. Subsequently, the plaintext input block 39 is supplied via the input multiplexer 34 to the block shift register 31, such that the plaintext input block 39 resides in the first portion 32 of the shift register 31 and that the random input block 38 resides in the second portion 33 of the block shift register 31. Before or after being stored in the register 31, the input blocks 38, 39 may be modified with the initial round keys 53, 54 to obtain the modified input blocks 64, 65. The round logic 30 may then fetch the random input block 38 (or modified first input block 64) from the second register portion 33, and begin a first initial processing round. Meanwhile, the target input block 39 (or modified target input block 65) is shifted to the second register portion 33, and becomes available to the round logic 30 to begin a second initial processing round after the first initial processing round has yielded a first intermediate block 40. The concurrent computations then continue as described above.

At the end of the two concurrent (en- or decryption) computations 60, 61, the (en- or decrypted) target output block 43 is read out from the first block register 32, while the (en- or decrypted) random output block 42 is read out from the second block register 33, and may be stored in the third register 36 for later use as random input block 38' for a next random computation 60'.

Further in the example of FIG. 1, before the key partitioning or expansion in the scheduling logic 45 commences, the random input key 51 is first entered into the key shift register 46. Subsequently, the target input key 52 is supplied to the key shift register 46, such that the target input key 52 resides in the first portion 47 of the shift register 46 and that the random input key 51 resides in the second portion 48 of the key shift register 46. The scheduling logic 45 may then fetch the random input key 51 from the second register portion 48, and begin a first initial key scheduling cycle. Meanwhile, the target input key 52 is shifted to the second register portion 48, and becomes available to the scheduling logic 45 to begin a second initial key scheduling cycle after the first initial key scheduling cycle has yielded a first initial round key 53. In this example, the first initial key scheduling cycle yields the first initial round key 53 before the round logic 30 commences with its first processing round. The concurrent key scheduling operations then continue as described above.

At the end of the two concurrent key scheduling operations 80, 81, the target final round key 58 is read out from the first key register 47, while the random final round key 57 is read out from the second key register 48, and may be stored in the third key register 50 for later use as random input key 51' for a next random scheduling operation 80'. Reading out the target final round key 58 may be useful in case a back-up of the en/decryption key is desired. Alternatively, the target final round key 58 may be discarded.

The ciphering unit 11 further includes a controller (14, not shown in FIG. 1), which is configured to manage the initialization and coordination of the circuits 20, 21, including loading, controlling, and readout of the registers 31-33, 36, 46-48, 50, and controlling of the round logic 30, scheduling logic 45, key adders 35 and multiplexers 34, 49.

The exemplary approach illustrated in FIG. 1 may be generally applied in any block ciphering unit that is split into a data path with round logic for processing the actual ciphering data and a key path with scheduling logic for generating and scheduling keys. A detailed example implemented specifically for AES ciphering will now be discussed with reference to FIG. 2.

Figure 2:
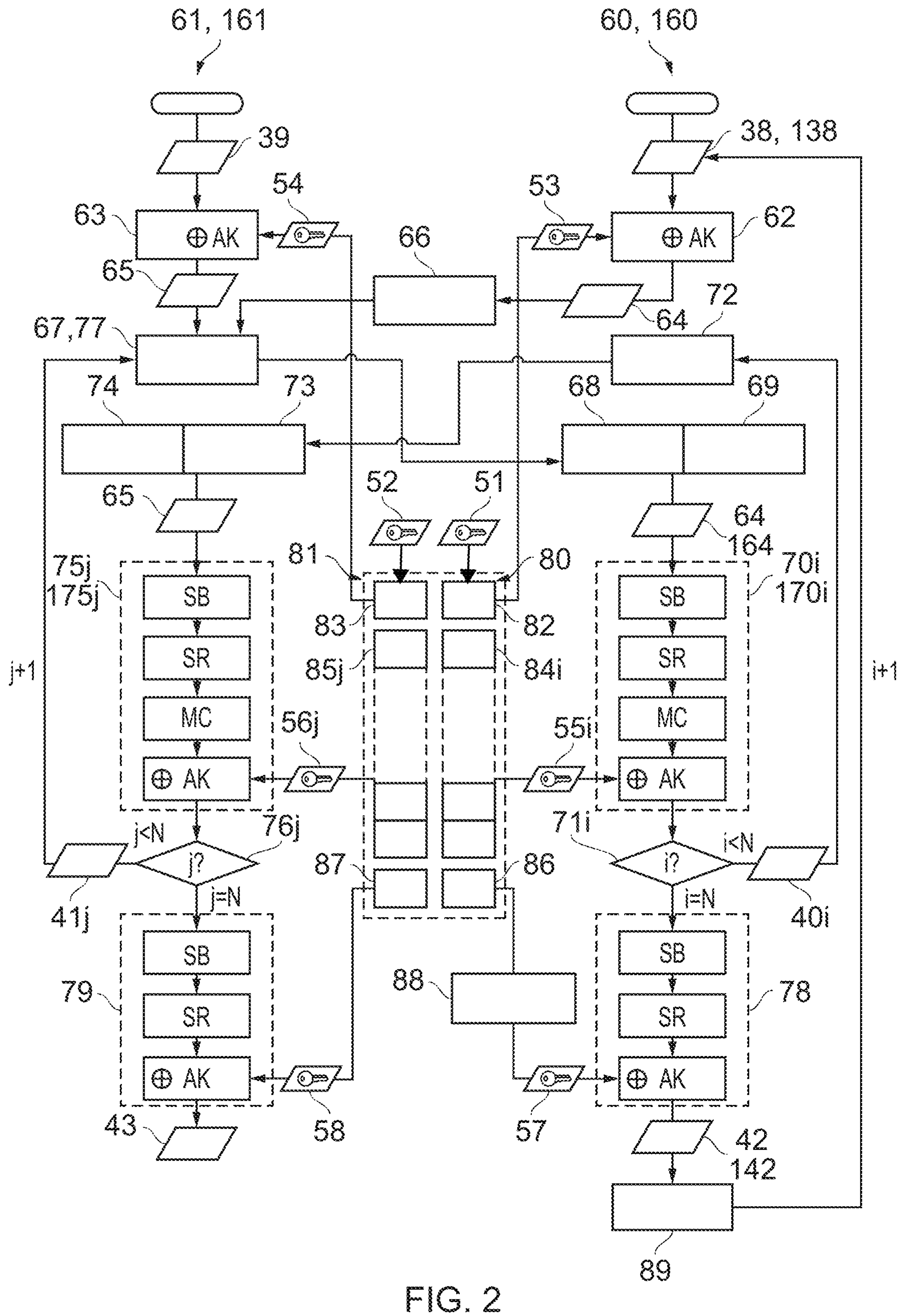
FIG. 2 shows a flow-chart of a cryptographic method, according to an embodiment.

FIG. 2 schematically shows an exemplary implementation of the proposed interleaved block cipher computation method, which in this example involves encryption. Here, the first and second block cryptographic computations 60, 61 are iterated key-alternating block cryptographic computations in accordance with the advanced encryption standard (AES). Further details on AES are disclosed in the AES specification in ref [1].

In the exemplary AES encryption method shown in FIG. 2, the input blocks 38, 39 are concurrently processed in two corresponding initial rounds 62, 63, two corresponding sets of multiple intermediate rounds 70*i*, 75*j*, and two corresponding final rounds 78, 79, to produce output blocks 42, 43.

AES involves iterated rounds of encryption (or decryption) and key expansion. As shown in FIG. 2, the exemplary AES ciphering method begins executing the first computation 60 with the input of an unencrypted random input (128-bit) data block 38, and concurrently begins executing the second computation 61 with the input of an unencrypted plaintext input data block 39. It is implicit that the initial data blocks, i.e. the random input block 38 and the target input block 39, have first been transformed into AES state matrices.

The term "state matrix" is used herein to refer to any initial, intermediate, or final data structure in which the actual data has been rearranged into a matrix composed of digital elements of identical sizes to allow the method to perform various cryptographic computations on the individual elements and/or on entire rows and/or columns of the matrix. In some embodiments, AES utilizes a fixed block size of 128 bits and a key size of 128, 192 or 256 bits. Different versions of AES (e.g., the 256-bit variant) can include different numbers of rounds and different key sizes. In this example, AES uses a fixed block size of 128 bits, which is constructed as a 4×4 state matrix of 16 elements each having a size of 1-byte. This 16-byte state matrix represents a buffer upon which the AES computations are performed. In the AES example of FIG. 2, each of the first and second input blocks 38, 39, modified input blocks 64, 65, first and second intermediate data blocks 40, 41, and first and second output blocks 42, 43 of the random and target computations 60, 61 is thus formed as a 4×4 byte state matrix.

The exemplary method with concurrent AES computations 60, 61 shown in FIG. 2 starts with the first AddRoundKey transformation 62 in the random cryptographic computation 60. At this action 62, a first initial round key 53 (which has the same size of 128 bits as the AES state matrix) is added to the random input block 38. This transformation 62 performs a logical exclusive disjunction operation ("XOR") on the random input block 38 and the initial round key 53, to produce a modified first input block 64 forming an intermediate AES state matrix.

Concurrently, the target cryptographic computation 61 starts at the second AddRoundKey transformation 63. In this action 63, a second initial round key 54 (128-bits) is added to the plaintext input block 39, to obtain a modified second input block 65.

At action 66, the modified first input block 64 is stored in the second block register 33. At action 67, the modified second input block 65 is stored in the first block register 32. It should be understood that the modified first input block 64 may be stored directly into the second block register 33, or alternatively may be stored initially in the first block register 32 and then be shifted into the second block register 33 when the modified second input block 65 is pushed into the first block register 32.

At 68, the modified first input block 64 is fetched from the second block register 33 and subjected to a round of AES processing 70*i*, to obtain a first intermediate block 40*i*. The first computation 60 starts with a first round counter i equal to 1, and increments this counter i by one in each subsequent round 70*i*. AES computations on single data blocks typically include nine intermediate rounds 70*i* after the initial round 62.

The first round 70*i* includes four transformations on the state matrix. The state sequentially undergoes a SubBytes (SB) transformation, a ShiftRows (SR) transformation, a MixColumns (MC) transformation, and an AddRoundKey (AK) transformation. The round 70*i* takes a data block with a size of 128 bits (4×4 byte state matrix) and generates an intermediate block 40*i* with a size of 128 bits. In this way, each newly generated intermediate data block 40*i* serves as input for a next processing round 70*i*+1 of the same cryptographic computation. In the case of the last round 78, the newly generated data block 42 forms the cipher result. Different rounds use different sub-keys but have the same basic structure.

The SubBytes transformation includes sixteen byte-substitutions actions, in which each byte in the state matrix undergoes a byte substitution based on the same procedure. Each byte substitution is a non-linear transformation, which may be implemented by a multiplicative inverse transformation combined with an affine transformation. Alternatively, the SubBytes transformation may be implemented in a classical way, in which each individual byte of the current AES state matrix is replaced by a byte value obtained by look-up in a pre-determined substitution table. This table is also referred to a byte substitution box or "S-Box" table. The multiplicative inverse operation and the S-Box substitution operation are invertible but non-linear operations on the state matrix.

Masking and obfuscation steps may (but do not necessarily have to) be executed within the SubBytes transformation, as will be discussed with reference to further exemplary embodiments in FIGS. 4*a*-7.

The ShiftRows transformation cyclically shifts the bytes in each row of the state matrix by determined offsets. In particular, the ShiftRows transformation in AES includes a circular left shift of each row of the 4×4 state matrix, in which different rows of the 4×4 matrix are left-shifted by different amounts. The bytes in the first row of the state matrix remain unchanged, the bytes in the second row of the state matrix are left-shifted by an offset of 1 byte, the bytes in the third row of the state matrix are left-shifted by an offset of 2 bytes, and the bytes in the fourth row of the state matrix are left-shifted by an offset of 3 bytes.

The MixColumns transformation operates on the four individual columns of the state matrix, combines bytes of the AES state matrix from each column using an invertible linear transformation. The MixColumns transformation takes four bytes as input and outputs four bytes, where each input byte affects all four output bytes.

The AddRoundKey transformation involves adding (XOR-ing) a respective first intermediate round key 55*i* to the state matrix. The first processing round 70*i* thereby ends, thereby yielding an intermediate block 40*i*. Each first intermediate round key 55*i* is unique, in that it is derived for each first processing round 70*i* by the key scheduling circuit 21 from the random input key 51. Each first intermediate round key 55*i* has the same size as the AES state matrix.

At decision block 71*i*, the first block computation 60 involves checking whether the round counter i is below the total number of intended rounds N. The value of N is determined by the length of the cipher key, as defined in the AES specification (ref [1]). The value of N equals ten for a 128-bit cipher key, equals twelve for a 192-bit cipher key, and equals fourteen for a 256-bit cipher key. If the check at 71*i* returns true, then the computation 60 increments the round counter i by 1 and stores the first intermediate block 40*i* in the first block register 32 at action 72. The first computation 60 then waits, while the second computation 61 is activated.

At action 73, the modified second input block 65 is fetched from the second block register 33 and proceeds through a round 75*j* of second AES processing. The second round 75*j* also involves the above-mentioned four transformations in which the state matrix of the modified second input block 65 is subjected to a SubBytes, ShiftRows, MixColumns, and AddRoundKey transformation, to produce a second intermediate block 41*j*. In this way, each newly generated intermediate data block 41*j* serves as input for a next processing round $\mathbf{75}_{j+1}$. In the case of the last round, the newly generated data block 43 forms the target cipher result.

In this case, the AddRoundKey transformation involves adding (XOR) a respective second intermediate round key 56*j* to the state matrix of the target computation 61 to obtain a second intermediate block 41*j*. Each second intermediate round key 56*j* is unique (i.e. distinct from previous round keys 56 as well as distinct from round keys 55*i* of the first computation 60), and produced by the key scheduling circuit 21 for each second processing round 75*j*.

At evaluation block 76*j*, the second block computation 61 involves checking whether the round counter j is below the total number of intended rounds N (which equals the number of rounds used the first computation 60). If the check at 76*j* returns true, the computation 61 increments the second counter j by 1, and stores the second intermediate block 41*j* in the first block register 32 at action 77. The second computation 61 then waits while the first computation 60 initiates a next round $\mathbf{70}_{i+1}$ of AES transformations.

The exemplary AES method of FIG. 2 concurrently iterates through several rounds 70*i* and 75*j* for each of the first and second ciphering computations 60, 61.

If the check 71*i* in the first computation 60 indicates that the round counter i for the first block computation 60 is equal to N, then the first computation 60 proceeds to the first final processing round 78. This final processing round 78 includes a final SubBytes (SB) transformation, a final ShiftRows (SR) transformation, and a final AddRoundKey (AK) transformation. This round 78 omits a MixColumns (MC) transformation.

The final SubBytes (SB) and ShiftRows (SR) transformations operate on the last intermediate block 40*i* (i=N) by performing the same actions as in the SubBytes and ShiftRows operations described above. The final AddRoundKey transformation involves adding (XOR) a respective first final round key 57 to the state matrix obtained from the final SubBytes and ShiftRows transformations, to obtain the first output block 42 that forms the random output ciphertext.

Similarly, if the check 76*j* in the second computation 61 reveals that the round counter j for the second block computation 61 has become equal to N, then the second computation 61 proceeds to the second final processing round 79. This final processing round 79 also includes a final SubBytes transformation, a final ShiftRows transformation, and a final AddRoundKey transformation, but no MixColumns transformation. The final AddRoundKey transformation involves adding a respective second final round key 58 to the state matrix obtained from the final SubBytes and ShiftRows transformations of the second computation 61, to obtain the second output block 43 that forms the target output ciphertext.

Either before or concurrently with the cryptographic computations 60, 61, the first and second input keys 51, 52 (see FIG. 1) are expanded into round keys 53-58, during the key scheduling operation by the scheduling circuit 21. The resulting subkeys include the first and second initial round keys 53, 54, the first and second intermediate round keys 55, 56, and the first and second final round keys 57, 58. In this example, each round key is 16 bytes long to match the size of the AES state matrix to which the key is being added in a respective AddRoundKey transformation.

The description of the exemplary concurrent computations 60, 61 in FIG. 2 corresponds to the order of operations executed during encryption of input data blocks 38, 39. For decryption computations, the input blocks start out as encrypted data ("cipher text") and the output blocks are decrypted data (which may be plain text or cipher text in the case that the input data was encrypted multiple times). Decryption computations are substantially similar in AES, but the order of operations is reversed and each of the operations is the inverse of the corresponding operation executed during encryption. In AES, the AddRoundKey operation is its own inverse because of the symmetric property of the keys used in AES. The inverse of SubBytes is InvSubBytes, which may for instance be implemented by a look-up operation in an inverse S-Box table. The inverse of MixColumns is InvMixColumns, which may also be implemented by a lookup operation. The inverse of ShiftRows is InvShiftRows.

Figure 3:
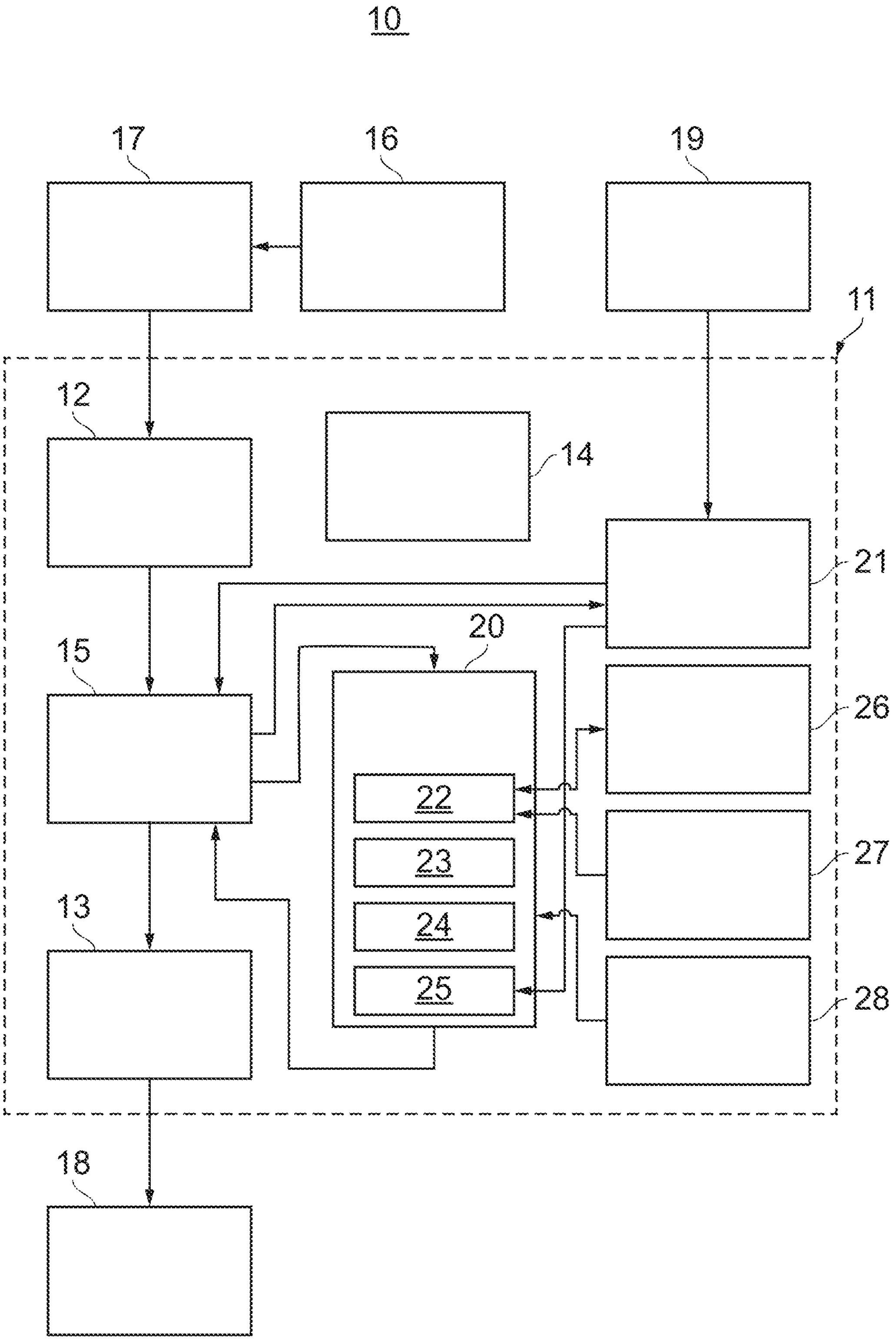
FIG. 3 schematically shows an electronic computing device with a ciphering unit according to an embodiment.

The methods involving concurrent block cryptographic computations with interleaved processing rounds as described herein may be tied to a computing machine. Such methods may for example be implemented as a network of digital logic gates, a computer-application program or service, a library, and/or other computer-program product. FIG. 3 schematically shows an exemplary embodiment of a ciphering processor unit 11 that is part of a computing system 10, and which is configured to execute one or more of the concurrent cryptographic computation methods described herein.

Computing device 10, which is only schematically indicated in FIG. 3, may take the form of a network of digital logic gates, one or more integrated circuits, a (personal, server, network, gaming, tablet, mobile) computer, a mobile communication device (e.g. smart phone), an Internet of Things (IoT) device, or any other computing device. The terms "computer", "server", "processor", and "memory", as used herein, all refer to electronic or other technological devices implemented with physical components, and exclude (groups of) people or mental activities. The computing system 10 includes physical devices configured to execute instructions, for instance instructions that are part of one or more applications, services, programs, routines, libraries, objects, components, or data structures, and which may perform a task, implement a data type, or transform the state of a component.

The processor unit 11 includes an input module 12, and output module 13, a control module 14, a memory module 15, a ciphering circuit 20, and a key scheduling circuit 21. The processor unit 11 further includes an S-box module 26, an obfuscation module 27, and a masking module 28. Part or all of the modules and circuits may be implemented by physical components. FIG. 3 schematically shows the various circuits and modules as separate components, but it should be understood that any or all of these components may be combined and integrated into single physical modules (for instance a single input/output module) in alternative embodiments.

Functionality of the processor unit 11 may be integrated together into one or more hardware logic components. Such hardware-logic components may for instance include application-specific integrated circuits (ASICs), field-programmable gate arrays (FPGAs), system-on-a-chip (SOC), and complex programmable logic devices (CPLDs). Individual components of the processor unit 11 may be distributed among two or more separate devices, which may be remotely located and/or configured for coordinated processing. In alternative embodiments, the processor unit 11 may include one or more hardware or firmware logic machines configured to execute hardware or firmware instructions (e.g. a network of digital logic gates hardwired to implement an algorithm). Aspects of the processor unit 11 may be virtualized and executed by remotely accessible, networked computing devices configured in a cloud-computing configuration.

The control module 14 is configured to coordinate the cooperation between and scheduling of the various modules 12, 13, 15, 26, 27, 28 and circuits 20, 21.

The input module 12 is configured to receive input data that is to be encrypted or decrypted by the ciphering unit 11, and to store the received input data in the memory module 15. The computing system 10 may further include a data storage module 16, a data partitioning module 17, a data fusing module 18, and an initial pseudo random number PRN source 19. The initial PRN 19 is configured to machine-generate a set of random bits, for instance during secure booting. These random bits may be used as seeding value for deriving the random input block 38 for the concurrent computations as described herein (for instance in the exemplary methods from FIGS. 1-2).

Plaintext or ciphertext data is obtained by the computing system 10—for instance by receiving it from an external device, by generating own data when running an application, or from another source—and stored in the data storage module. The partitioning module then divides the obtained data into suitably-sized blocks and supplies the portioned blocks in a determined (possibly but not necessarily logical/chronological) order to the input module 12 of the ciphering processing unit 11.

The output module 13 is configured to receive first and second output blocks 42, 43, as produced by the ciphering circuit 20 as final results of the concurrent cryptographic operations 60, 61.

In the example of FIG. 3, the ciphering unit 11 is configured to execute cryptographic operations 60, 61 in accordance with AES. Accordingly, the ciphering circuit 20 includes a byte substitution component 22, a row shifter component 23, a column mixer component 24 and a round key adder component 25. These components 22-25 are configured to execute SubBytes transformations, ShiftRows transformations, MixColumns transformations, and AddRoundKey transformations, for instance the AES transformations described in the exemplary encryption method from FIG. 2, and/or configured to execute InvSubBytes transformations, InvShiftRows transformations, InvMixColumns transformations, and InvAddRoundKey transformations in decryption operations.

Output blocks (e.g. 42 and 43) produced by the ciphering processing unit 11, either by encryption or decryption computations, are transmitted via the output module 13 to the data fusing module of the computing system 10. The data fusing module is configured to merge the output blocks into ciphertext or plaintext data that is comprehensible for the application or process that initiated the encryption or decryption.

In alternative embodiments, the data storage module, partitioning module, fusing module and corresponding functionalities may be integral part of the ciphering processing unit 11.

The computing system 10 may further comprise a communication module (not shown), which is configured to send and/or receive signal data between the computing system 10 and an external device. Such a communication module may include a modem, a network interface card (NIC), a communications port (e.g. USB port), a personal computer memory card international association (PCMCIA) card, etc. The signal data is being sent and/or received the communication module via a channel that may carry signals in electronic, electromagnetic, optical or other signal forms, and may be implemented using a wireless medium (e.g. WiFi, Bluetooth, radio), wire or cable, fibre optics, or other communication medium.

The round-interleaved processing in the first and second cryptographic computations 60, 61 reduces or even completely removes (first order) leakage from the registers 31, 46 in the ciphering unit 11 and lowers the SNR of the combinatorial logic. In further embodiments, the interleaved principle is combined with other side-channel countermeasures for the combinatorial logic, to improve resistance of the ciphering unit against side-channel attacks. The the proposed additional side-channel countermeasures are specifically targeted at circuit components configured to execute iterated block cryptographic methods, such as AES ciphering.

Figure 4A:
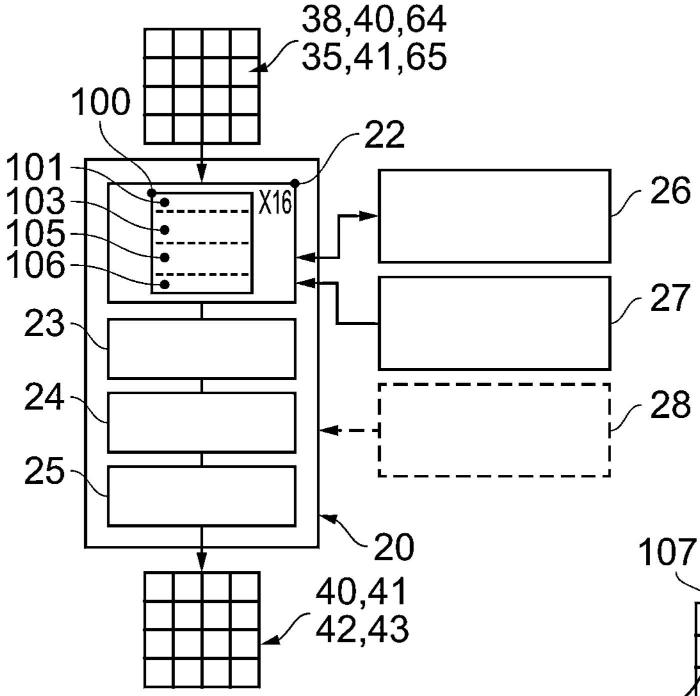
FIG. 4*a* schematically shows a block diagram for an AES ciphering circuit according to an embodiment.

FIG. 4*a* illustrates an exemplary data flow in an AES ciphering circuit 20 for processing a single data block (e.g. state matrix 38, 40, or 64 in the first computation 60 or state matrix 39, 41, or 65 in the second computation 61) to produce a modified block (e.g. block 40, 41, 42 or 43). The ciphering circuit 20 includes byte substitution, row shifter, column mixer, and round key adder components 22-25. The AES algorithm further relies on functionality of a key scheduling circuit (e.g. circuit 21 in FIG. 1). In AES, both the processing rounds and the key scheduling operations involve the use of SubBytes transformations during encryption, or InvSubBytes during decryption.

Each of the elements in a respective block (i.e. 38-41 or 64-65) has a size of one byte. The proposed side-channel countermeasures involve using an obfuscation module 27 for modifying the functionality of the SubBytes transformations (and/or the InvSubBytes transformations during decryption). SubBytes is a nonlinear transformation in which each individual input byte in a block is replaced by an output byte via a determined byte substitution function. The steps taking place within the (Inv)SubBytes transformation may be provided with the help of a separate S-Box module 26, which may be accessed by the byte substitution component 22 and possibly also by the key scheduling circuit 21.

The side-channel countermeasures further include a module 28 for masking the states matrices when they undergo various linear transformations applied during the processing rounds.

Encryption and decryption in AES are generally based on polynomial operations acting on eight-bit elements in a finite binary field called a Galois Field $GF(2^8)$. One known way to implement the byte substitution function involves finding the multiplicative inverse of the eight-bit element when regarded as an element of the Galois field $GF(2^8)$ and applying an affine transformation. In SubBytes transformations, the inversion is followed by the affine transformation, whereas in InvSubBytes transformations, the affine transformation is applied before the inversion.

The multiplicative inversion over the field $GF(2^8)$ is computationally the costliest operation of the S-Box function. To reduce the size and complexity of the S-Box circuitry, the present proposal instead calculates the S-Box function by means of sub-field arithmetic. This involves temporarily mapping the elements of $GF(2^8)$ to a Galois subfield such as $GF((2^4)^2)$ or $GF(((2^2)^2)^2)$, calculating the inverse within this subfield, and then changing back to the original field $GF(2^8)$.

In the example of FIG. 4*a*, the byte substitution component 22 is implemented by sixteen finite field arithmetic components 100, with each arithmetic component 100 being configured to operate on an individual byte element. The arithmetic component 100 includes a field basis transformation subcomponent 101, a multiplicative inversion subcomponent 103, a field basis back-transformation subcomponent 105, and an affine transformation subcomponent 106.

The transformation subcomponent 101 is configured to transform each byte element of the block from the regular eight-bit representation in $GF(2^8)$ into a Galois sub-field representation. The multiplicative inversion subcomponent 103 is configured to operate on the resulting transformed element to produce an inverted element in the sub-field. The transformation subcomponent 105 is configured to transform the inverted element back to the original field $GF(2^8)$. The subcomponent 106 is configured to execute an affine transformation on either the input or the output byte, depending on whether encryption or decryption is involved.

Figure 4B:
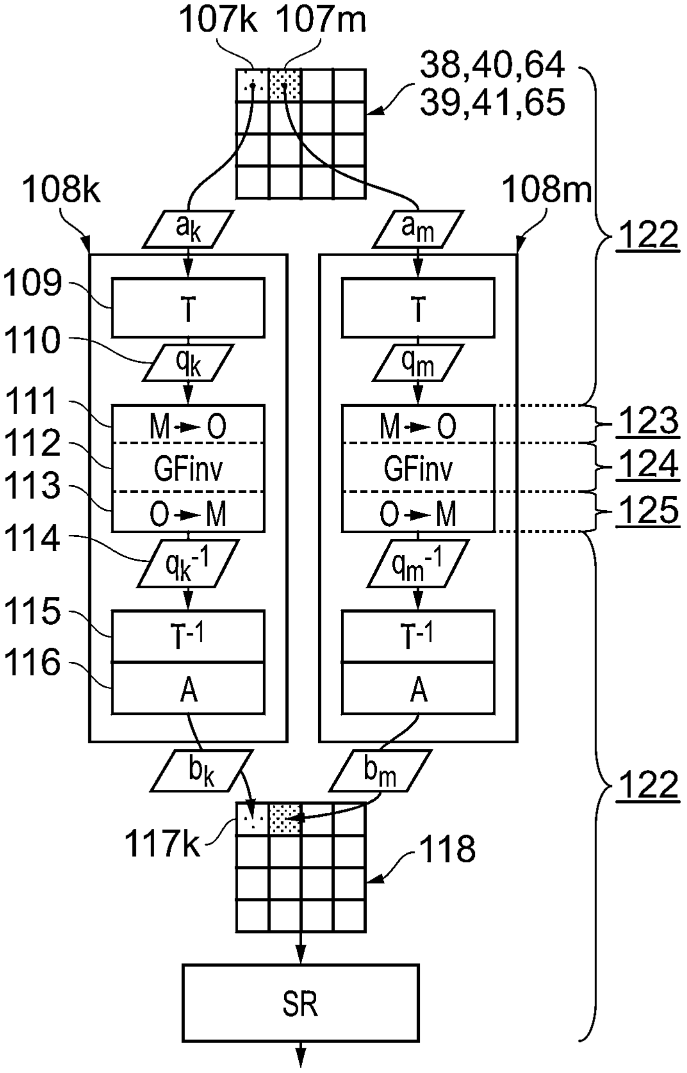
FIG. 4*b* schematically shows a flow diagram with encryption operations executed in the ciphering circuit from FIG. 4*a;*
Figure 4C:
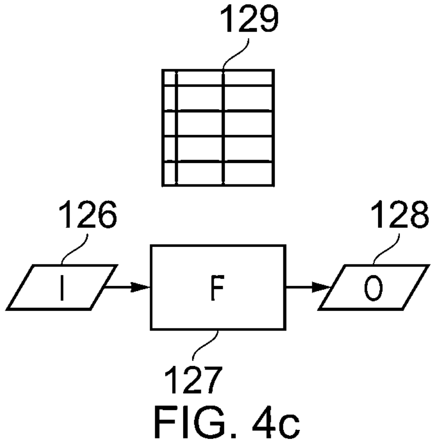
FIG. 4*c* schematically shows a mapping of functional correspondences between input and output of one of the encryption operations from FIG. 4*b;*

In the embodiment of FIGS. 4*a-c*, the obfuscation takes place in the multiplicative inversion subcomponent 103 and involves modification of the functional correspondences 142 between successive ciphering operations 60, 160.

FIG. 4*b* shows a portion of the exemplary method where SubBytes is executed. Here, each byte element $a_k$ ($\mathbf{107}_k$) of the input block (38, 40 or 64) is processed and transformed via a distinct byte substitution transformation $\mathbf{108}_k$ into an output byte $b_k$ ($\mathbf{117}_k$). The byte transformation obeys a one-to-one relation, in that each of the $2^8$ possible input bytes ax will correspond to a specific one of the $2^8$ possible output bytes $b_k$, and vice versa. This ensures that the byte substitutions 108 are invertible.

The input byte ax is initially represented as polynomial coefficients in the original field $GF(2^8)$. At 109, which is executed by remapping subcomponent 101. The input byte ax is transformed by re-expressing the byte ax in terms of the new subfield basis, to obtain a transformed byte $q_k$.

At 112, which is executed by the inversion subcomponent 103, the inverse of byte $q_k$ is calculated, thus obtaining an inverted byte $q_k^{-1}$. Here, the Galois inverse $q_k^{-1}$ is calculated using finite field arithmetic defined in the Galois subfield with corresponding basis functions.

At 115, which is executed by the back-transformation subcomponent 105, the inverted byte $q_k^{-1}$ is mapped back onto the original polynomial basis in $GF(2^8)$.

At 116, the back-transformation 115 is directly followed by an affine transformation executed by subcomponent 106, to obtain the output byte br. In this affine transformation 116, the bits of $q_k^{-1}$ are scrambled by XOR-ing using four different circularly rotated versions of itself and with a special constant byte c=0x63, which can be expressed by the invertible matrix operation $b_k = A \cdot q_k^{-1} + c$. This affine transformation 116 provides an invertible scrambling of the bits, wherein the additional c-byte ensures that the input byte 0x00 is re-mapped onto a non-zero value.

The byte substitutions 108 are executed separately for each byte ax of the input block, and the obtained bytes $b_k$ are reassembled into an intermediate block 118 that forms the input of the following ShiftRows transformation. Preferably, the byte substitutions 108*i* for each of the sixteen input bytes ax of one block are executed in parallel by sixteen identical copies of the field arithmetic component 100.

In the presently proposed methods, logical obfuscation 124 is implemented in the inversion subcomponent 103, and is applied to the signals when they proceed through the calculation of multiplicative inverses 112. The part of the signal path in which these inverse calculations 112 take place is referred to herein as the "obfuscated domain" 124. The proposed obfuscation has a dynamical character, because the obfuscation is changed in-between subsequent ciphering computations 60 and 160.

In the field of signal data obfuscation, it is known to mask a data signal when it is stored in memory and/or in transit through components or signal paths of a ciphering system. "Boolean masking" is one such known masking technique, in which the original signal S is replaced by a signal $S' = S \oplus M$, wherein the symbol $\oplus$ represents the bit-wise XOR between the original signal S and the mask signal M. The mask M is a determined sequence of determined but meaningless binary data, which may for instance be generated at source code compilation, at runtime, or may be altered during method execution if certain conditions are fulfilled. When the signal S' is masked, the original signal S does not appear in memory or in nets of the circuit.

In the embodiment of FIGS. 4*a*-4*c*, Boolean masking is applied during the various linear transformations in the cryptographic computations. Linear transformations H obey the relation $H(S') = H(S \oplus M) = H(S) \oplus H(M)$. The factored-out masked term makes it easy to remove the mask from the masked output. By contrast, the output of a non-linear transformation on a masked signal generally has no factored-out masked term, which complicates removing the mask as needed for obtaining the ciphered signal after the ciphering operation has completed.

In AES, such linear transforms include ShiftRows, MixColumns and AddRoundKey. In the exemplary method of FIG. 4*b* the Boolean masking is applied in the linear stages that are designated as the "masked domain 122", but the masking is not applied in the obfuscated domain 124. In particular, the masking is applied to the data blocks during the ShiftRows, MixColumns and AddRoundKey transformations, but is not applied during the non-linear part 112 of SubBytes.

The multiplicative inversion 112 over the field GF($2^8$) shown in FIG. 4*b* is non-linear, but the remapping and affine transformations 109, 115, 116 are linear. The obfuscated domain 124 may therefore be applied only at the non-linear GF($2^8$) inversion 112, whereas the remapping and affine transformations 109, 115, 116 are joined with the other linear transformation and subjected to the masking. This allows protecting the linear and non-linear parts of the ciphering algorithm in an easily applicable manner at reasonably low costs.

In the example of FIG. 4*b*, the masked domains 122 interface directly with the (unmasked) obfuscated domain 124, to avoid intermediate switching or operations that could reveal clear signal values. Each of the byte substitutions 108 in the example of FIG. 4*b* therefore includes a transition 111 from masked to obfuscated (M→O) signal values, and a transition 113 from obfuscated back to masked (O→M) signal values, which reside at the boundaries of the multiplicative inversion 112. The M→O transition 111 ensures that a masked byte element $q_k$ is transformed directly into an obfuscated input for the inversion 112.

To achieve low-cost masking, the mask may be a byte-size mask that is identically applied to each individual byte in any of the intermediate blocks that traverse any linear part of the ciphering circuit. Using the same mask for all bytes has the advantage that the same mask remains present, even after the relations between the input and output bytes have been severely decorrelated by the ShiftRows, MixColumns and AddRoundKey transformations.

In one exemplary method, all rounds in the computation will be masked with the same byte-level mask, so that the mask byte remains stable during a full cryptographic computation 60. The mask byte may for instance be computed once at the beginning of the cryptographic computation.

In methods involving two concurrent ciphering computations with interleaved rounds in which one of the computations 60, 160 is based on random data 38, 138 (e.g. FIGS. 1-2), the mask byte used for subsequent concurrent computations 160, 161 may be derived from any intermediate block 40*i* or output block 42 of the preceding random computation 60, to obviate the need for a separate PRNG for generating the masks.

FIG. 4*c* generally illustrates a functional relation F, 127 between the input signals 126 (i.e. the set of all possible input bytes $a_k$) and the output signals 128 (i.e. the set of all possible output bytes $b_k$) of a byte substitution operation 108. As mentioned above, the functional relation 127 is a one-to-one function F with a finite countable set of discrete input and output values 126, 128. The function F can be represented by an encoding table 129 (or "logical truth table") of finite length, containing the relation between all possible multi-bit inputs 126 and the corresponding multi-bit outputs 128 of this function F.

The proposed dynamic obfuscation 124 involves modifying the functional correspondences 127 between the input signals 126 and output signals 128 of the finite field arithmetic components 100 after each ciphering computation 60. This modification yields a fresh set of functional correspondences in the finite field arithmetic component 100, which is then applied during the byte substitution transformation(s) in the next ciphering computation 160.

During this modification, the input signals 126 and output signals 128 are re-encoded in a way that is known to the processing unit 11 but is seemingly arbitrary and unpredictable for a potential attacker. At the same time, the functional relation F between the inputs 126 and outputs 128 is modified so as to respect the global functioning of the byte substitution transformation 108.

Figure 5:
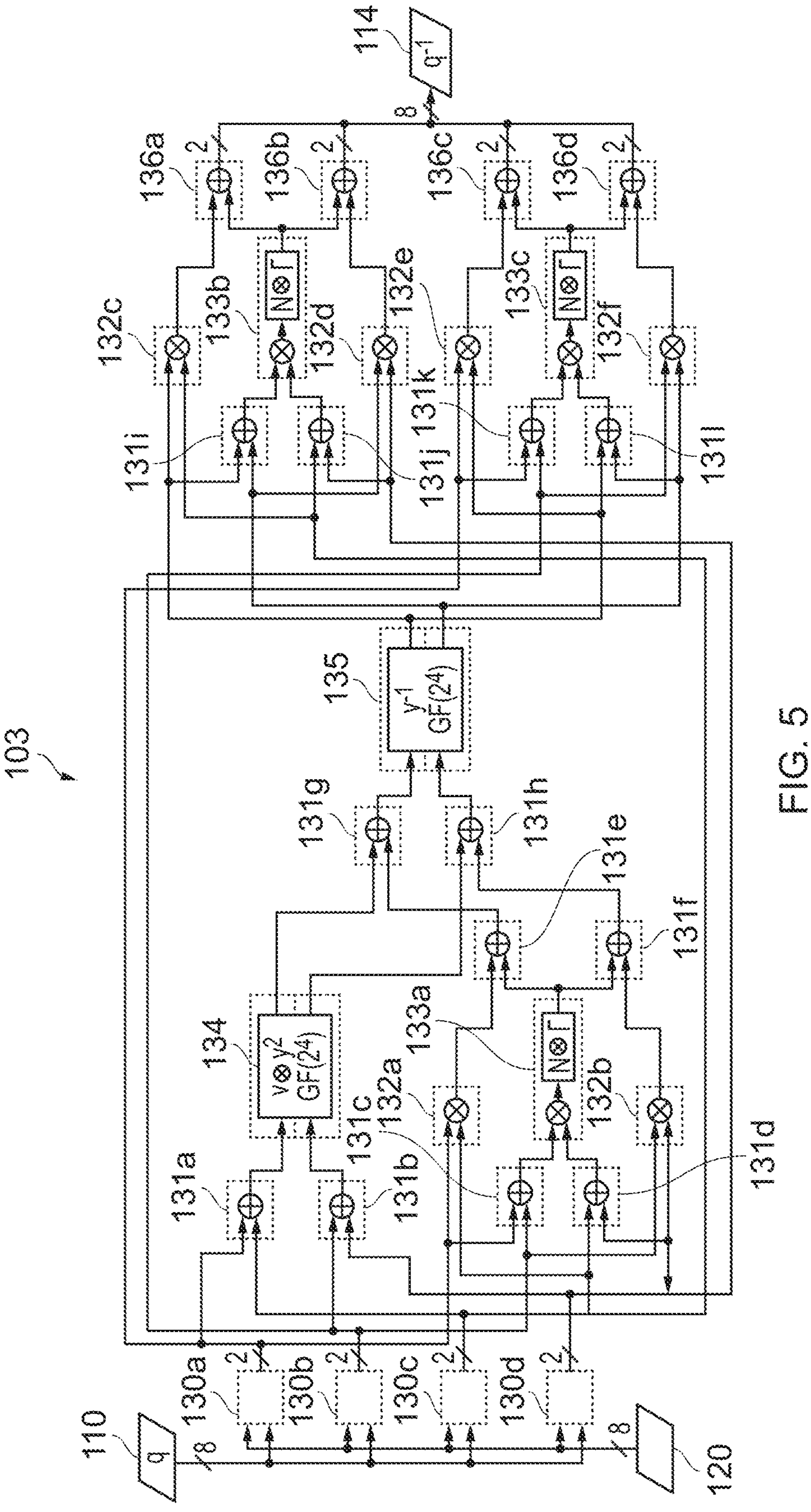
FIG. 5 schematically shows a modified Canright byte-inversion circuit, according to an embodiment.

FIG. 5 illustrates a schematic of an exemplary inversion subcomponent 103, which has been implemented using a Canright GF($2^8$) inverter architecture operating on a normal basis subfield. This modified Canright inverter 103 is configured to execute the calculation 112 of a multiplicative inverse of a byte element (see FIG. 4*b*), with the modification allowing the calculation 112 to proceed in obfuscated form 124. The byte-level mapping transformations 109, 115 and the affine transformation 116 are not part of the inversion circuit 103. The byte substitution component 22 (e.g. in FIG. 4*a*) may include sixteen instances of such Canright-based inversion circuits 103, to allow parallel processing on all elements $q_k$ in one state matrix.

The exemplary circuit 103 from FIG. 5 is composed of a plurality of interconnected subfield operators 131, 132, 133, 134, 135, 136, comprising twelve GF($2^2$) adders 131, six GF($2^2$) multipliers 132, three GF($2^2$) multiplier-scalers 133, a GF($2^4$) squarer-scaler 134, a GF($2^4$) inverter 135, and four final GF($2^2$) adders 136. The inversion subcomponent 103 further includes a plurality of masked-to-obfuscated mapping operators 130 at the input of the circuit.

In this architecture, the GF($2^2$) adders 131, GF($2^2$) multipliers 132, GF($2^2$) multiplier-scalers 133, and final GF($2^2$) adders 136 have been decomposed down to subfield GF($2^2$). Each of the GF($2^2$) subfield operators 131, 132, 133, 136 comprises two input ports and one output port. Each of these ports is configured to convey a two-bit signal, and the corresponding GF($2^2$) subfield operator is configured to operate on two two-bit signals associated with the subfield GF($2^2$). The GF($2^4$) squarer-scaler 134 and GF($2^4$) inverter 135 have been decomposed down to subfield GF($2^4$). Each of the GF($2^4$) subfield operators 134, 135 comprises an input port for conveying a four-bit input signal as well as an output port for conveying a four-bit output signal. These GF($2^4$) subfield operators are configured to operate on a four-bit signal associated with the subfield GF($2^4$). Further details of the normal-basis GF($2^8$) inverter and the decomposition of its normal-basis GF($2^4$) multipliers into GF($2^2$) subfield operators can be found in section 2 of Canright's paper (ref. [2]).

Canright's architecture is a very suitable candidate for simplifying the logic obfuscation 124 applied to the inversion subcomponent 103, because the smaller subfield operators 131, 132, 133, 134, 135, 136 obtained from decomposing the GF($2^8$) inversion can be independently obfuscated. Applying the dynamic obfuscation 124 comprises re-encoding the individual correspondences between respective input and output signals for each individual subfield operators 131, 132, 133, 134, 135, 136.

In the present proposal, all wires in the Canright inversion circuit of FIG. 5 are separately obfuscated by re-encoding their signal values in a different way. This corresponds to composing random functions with the subfield operators 131, 132, 133, 134, 135, 136, such that a different representation of the same function is obtained in/after each cryptographic computation 60, 160. The obfuscation 124 involves maintaining an encoding table of four entries for two-bit wires and maintaining an encoding table of sixteen entries for four-bit wires. Since each of the subfield operators 131, 132, 133, 134, 135, 136 in FIG. 5 has a total of four input bits, this implies maintaining an encoding table of sixteen values for each subfield operator 131, 132, 133, 134, 135, 136, resulting in similar implementation complexity each of these operators. Encoding of the output will be done in terms of two-bit bundles.

It will be understood that the possible implementations of the inversion subcomponents 103 are not limited to a Canright-based circuit design. In alternative embodiments, the inversion subcomponents may be implemented according to a Satoh implementation operating on a polynomial basis subfield (see e.g. [ref. 3]), on a Nogami implementation operating on a mixed basis subfield (see e.g. [ref 4]), or on various other circuits that implement the byte inversion by means of several Galois subfield components.

The O→M transition 111 and M→O transition 113 (FIG. 4*b*) may be implemented in the exemplary Canright-based circuit 103 by the four mapper operators 130 at the input of the circuit 103, and the four modified $GF(2^2)$ adders 136 located at the output of the circuit 103. When the masked byte elements ax are subjected to the byte substitution 108, also the applied mask will undergo the basis and affine transformations 109, 115, 116. These transformations change the representation of the mask inside the byte substitution step 108 relative to the mask as being applied in ShiftRows, MixColumns, and AddRoundKey. The regular non-transformed mask will be indicated with numeral 119 while the transformed masks will be indicated with numerals 120 and 121 (see e.g. FIG. 7)

The mapper operators 130 are configured to bring about the M→O transition 111. Each of the mapper operators 130 includes one two-bit input port for receiving a distinct two-bit portion of the transformed mask 120, and another two-bit input port for receiving part of the byte element 110, q. The mapper operator 130 modifies the received two-bit part of the byte element 110 into a two-bit un-masked signal at its output port that may pass through the inversion circuit 103.

In the obfuscated $GF(2^2)$ and $GF(2^4)$ operators 131, 132, 133, 134, 135, all the signal inputs and outputs convey unmasked signals, which are dynamically obfuscated 124 in-between ciphering computations as described above.

Each of the final $GF(2^2)$ adders 136 at the output of the circuit 103 is configured to receive two two-bit obfuscated input signals, and to emit a two-bit non-obfuscated but masked output signal, thus taking care of the O→M transition 113. These final $GF(2^2)$ adders 136 ensure that the inverted byte 114, $q^{-1}$ that forms the output of the $GF(2^8)$ inversion leaves the Canright circuit 103 in masked form, to be processed further by the linear parts of the algorithm. The obfuscation output encoding for these $GF(2^2)$ adders 136 may be permanently set to the identity function. The re-application of the transformed mask 120 may be achieved with a layer of XOR-operations at the output side of the encoding table 146 belonging to each of these adders 136. Alternatively, each of the $GF(2^2)$ adders 136 may include a further port (not shown in FIG. 5) for receiving the two-bit portion of the transformed mask 120, to allow each of these adders 136 to reapply an appropriate part of this mask 120.

Figure 6A:
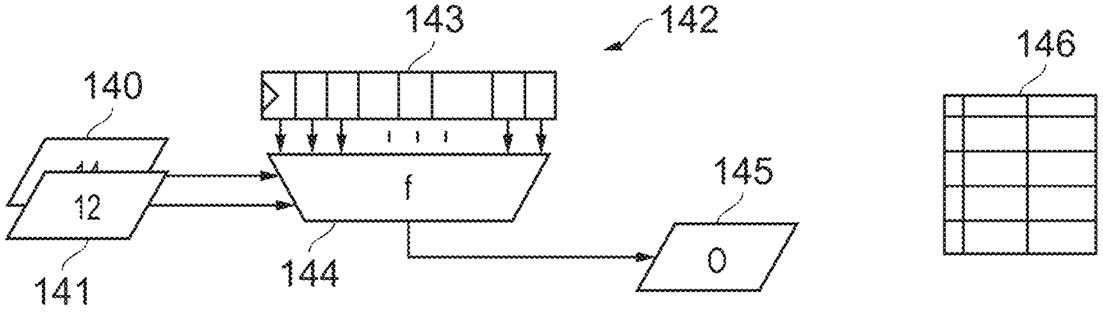
FIGS. 6*a*-6*b* schematically show initial and modified input-output correspondences for a subcomponent of the inversion circuit from FIG. 5, and FIG. 7 schematically shows a ciphering system architecture according to an embodiment.
Figure 6B:
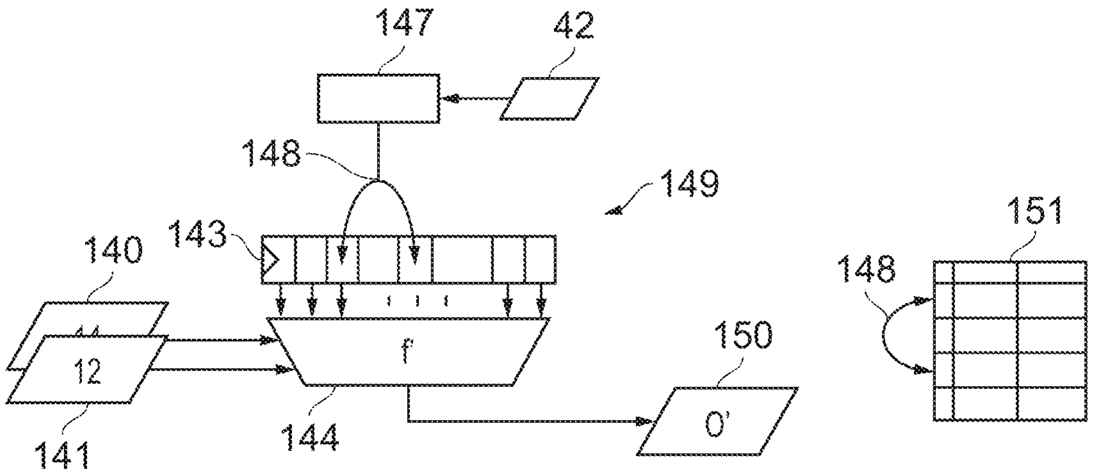

FIGS. 6*a*-6*b* illustrate an exemplary implementation of logic obfuscation 124 as applied to a single subfield operator in the byte inversion subcomponent 103. In this example, the combinatorial function for selecting and changing the obfuscation is implemented with the use of registers and multiplexers.

FIG. 6*a* illustrates that a respective one of the $GF(2^2)$ subfield operators 131, 132, 133, 136 has two input ports for receiving two corresponding two-bit input signals 140, 141, as well as one output port for emitting a two-bit output signal 150. The finite set of functional correspondences f, 142 between all possible four-bit input signals 140, 141 and all corresponding two-bit output signals 145 is stored in a 32-bit register 143. The function f describing the finite set of possible input-output correspondences 142 for the subfield operator may be represented by an encoding table 146. As illustrated in FIG. 4*c*, the Canright circuit 103 embodies a one-to-one functional correspondence 127 between all possible eight-bit inputs and all possible (inverted) eight-bit outputs. By contrast, the functional correspondence 142 for each individual subfield operator 131, 132, 133, 136 does not necessarily possess this one-to-one property, except for the $GF(2^4)$ inverter 135 and the $GF(2^4)$ squarer-scaler 134.

The values in register 143 are in signal connection with sixteen input ports of a 16-to-1 composite multiplexer 144 (or a tree of interconnected multiplexers). The individual input ports of the multiplexer 144 correspond with the individual values for the sixteen possible outputs 145 of the function f (which includes duplicate output values when f is not one-to-one). The multiplexer 144 is configured to select a particular entry from the register 143 and to emit this selected entry as output signal 145 at the output port of the multiplexer 144. The two input signals 140, 141 of the subfield operator are supplied to the two selector ports of the multiplexer 144, and are thus used to select one of the sixteen entries from the register 143 as the present output signal 145. The encoding table 146 effectively defines the relation between the input signals 140, 141 and the register addresses with output values 145. Depending on the selected addressing relation as is stored in the encoding table 146, this combination of register 143 and multiplexer 144 can be configured to produce the logical behaviour of any of the subfield operators.

FIG. 6*b* illustrates an implementation of dynamic logic obfuscation 124 applied to a single subfield operator that is initially characterised by the function f in FIG. 6*a*. The behaviour of the subfield operator can be dynamically modified by changing the set of possible function outputs for this subfield operator, for instance by swapping 148 the corresponding bits in the register 143. The proposed obfuscation mechanism includes selector logic 147 that performs the swapping 148 of entries in the register 143 based on externally given selection indices. The swapping 148 may for instance take place in one clock cycle during the loading of the input block 38, 138 in each cryptographic computation 60, 160, to avoid incurring introducing performance overheads.

Each encoding table 146 is addressed by a set of four bits composed of the two-bit first input 140 and two-bit second input 141. One of the inputs (e.g. 140) will act as the most significant part of the table address, while the other one (e.g. 141) will act as least significant part. The selector logic 147 may be configured to swap blocks of four entries in the table 146 in case the encoding of the most significant part changes, whereas the control logic 147 may be configured to swap entries that are separated by steps of four in case the encoding of the least significant part changes. The control logic 147 may further be configured to swap 148 the two concerned entries in the register table 146 when the output encoding changes, thereby obtaining a modified encoding table 151.

The method may include extracting information (e.g. random bits) from the output block 42 generated by the first cryptographic computation 60 (FIG. 2) to indicate the particular entries in the encoding registers 143 that are to be swapped 148 so as to achieve the logical obfuscation 124 in the subsequent ciphering computation 160.

The same re-ordering instruction will be supplied to the registers 143 of other subfield operators in the circuit 103 that share a common signal between one of their input or output ports. This ensures that when a signal on a net of this circuit 103 is re-encoded as result of an obfuscation instruction, all subfield operators that emit or receive this signal will evolve together to maintain overall functional correctness of the obfuscation.

By repeatedly re-ordering e.g. swapping 148 the content of the registers 143 for the subfield operators 131, 132, 133, 134, 135, 136, the encoding relations f between the inputs 140, 141 and outputs 145 of the operators—and thereby also the overall encoding relation F between the inputs 126 and the outputs 128 of the overarching byte inversion function 112 of the Canright circuit 103—are incrementally obfuscated in an efficient yet non-trivial manner.

Adapted versions of the register, multiplexer and selector logic may be constructed for the GF($2^4$) subfield operators 134, 135, to accommodate the function and obfuscation of a four-bit input selection and four-bit output signal.

The reset values of the control logic 147 are preferably matched to the specification of the original logical function provided by the subfield operator 131, 132, 133, 134, 135, 136. This ensures that the original (i.e. non-obfuscated) operator functions f are deployed during startup of the circuit 103, without needing to load the specification of these operator functions f.

The described selector logic may be replicated to implement obfuscation in each of the subfield operators 131, 132, 133, 134, 135, 136 of the inverter subcomponent 103. Alternatively or in addition, the register 143 of one particular subfield operator in one inverter circuit 103 may be shared by all other identical subfield operators located in the same part of each of the other fifteen circuits 103, so that all byte elements in the block are subjected to the same obfuscation.

Figure 7:
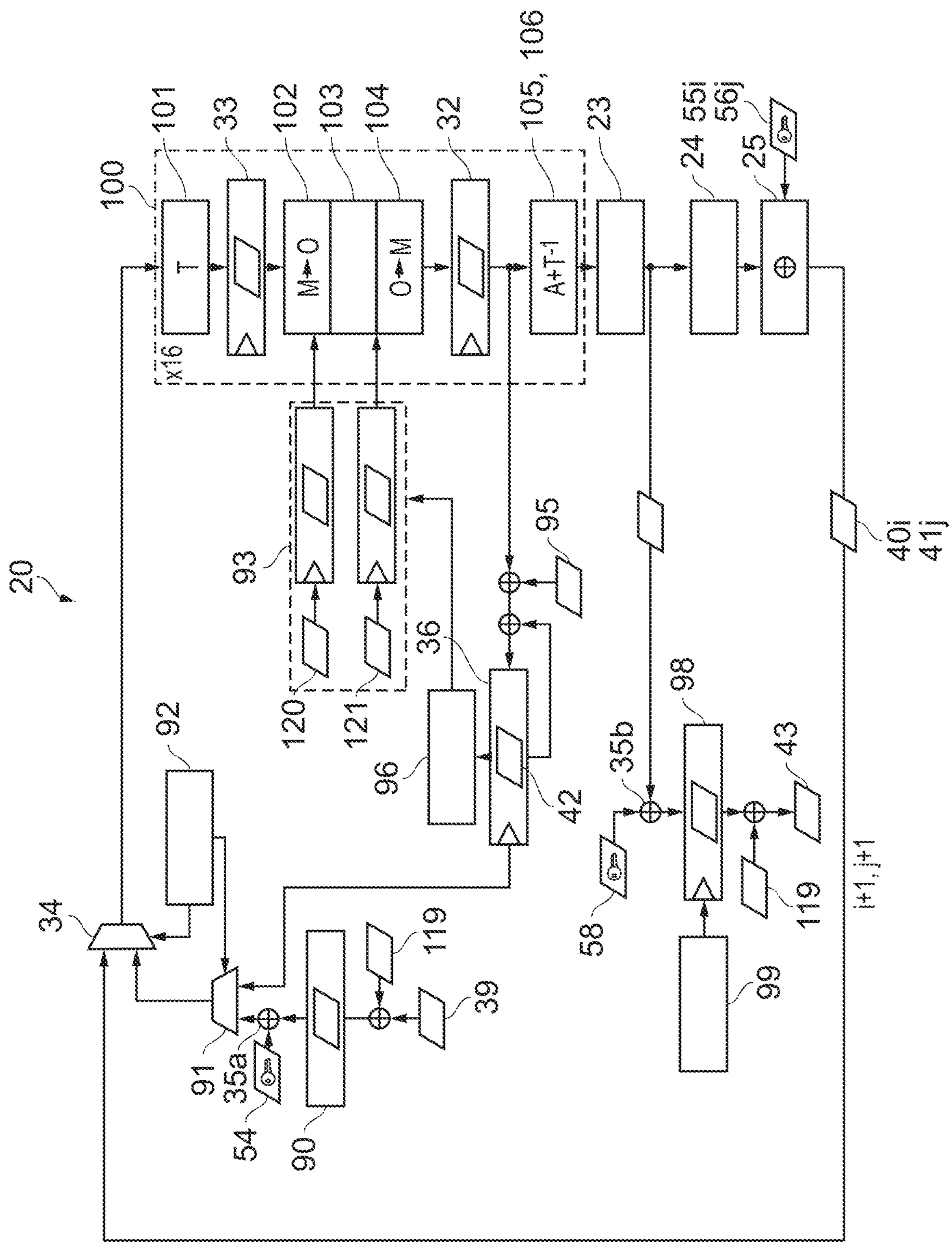

FIG. 7 schematically shows an exemplary ciphering circuit 20 that implements the concurrent cryptographic computations with round-interleaving, the masking 122 applied during the various linear transformations, and the dynamic obfuscation 124 applied during the byte inversions 118 inside the inversion subcomponents 103.

The circuit 20 shown in FIG. 7 is configured to operate in an enciphering mode wherein the cryptographic computation involves encryption of target data, concurrently with another computation involving encryption of random data. FIG. 7 depicts a target data block 39 and a random data block indicated by a random output block 42 from a previous random computation.

The input stage of the ciphering circuit 20 includes an input register 90, a key adder 35*a*, a mask adder (not indicated), an initial input multiplexer 91, an initialization component 92, a round input multiplexer 34, and a random output block register 36. The mask adder is configured to add the regular mask 119 to the input block 39, and the input register 90 is configured to store the resulting block. The key adder 35*a* is configured to add the first round key 54 to this resulting block at the appropriate time when the block is fetched from the input register 90. The random output block register 36 is configured to receive and store the random output block 42 obtained from a preceding encryption computation. The random seed 95 in FIG. 7 represents an initial 128-bit seed coming from an external source, such as a value from the external PRNG 19 during secure booting of the computing device 10 shown in FIG. 3.

The initial input multiplexer 91 is configured to select either the initial random block 42 from the register 36 or the modified block of target input data coming from the adder 35*a*, and to forward the selected block to the round multiplexer 34. The round multiplexer 34 is configured to select and forward either the initial input blocks or subsequent blocks 40*i*, 41*j* produced by intermediate processing rounds.

The output stage of the ciphering circuit 20 includes an output register 98, a key adder 35*b*, a mask adder (not indicated), and a readout component 99. The key adder 35*b* is configured to add the final round key 58 to the block obtained from the last processing round. The obtained block is stored in the output register 98, waiting until the readout component 99 provides the instruction to furnish the block. If that happens, the mask adder re-applies the mask 119 to that block in order to yield the resulting target data block 43.

The masking and obfuscation stage of the circuit 20 includes a masking and obfuscation (M-O) controller 93 and a selector component 96. The selector component 96 is in signal connection with the output block register 36, and is configured to fetch and extract random information from this output block 42 in order to feed the swapping decisions made in the M-O controller 93.

The M-O controller 93 provides storage for the obfuscation functions 124 and the M→O and O→M transition functions 111, 113 used in invertor subcomponents 103, as well as storage for the transformed masks 120, 121 that are to be applied here. The random information from the output block 42 received from the selector component 96 may thus be used for instructing the swapping logic 147 (see e.g. FIG. 6*b*) to change entries in the function registers 143 of the various operators in the invertor subcomponents 103 in-between subsequent ciphering computations.

The masks applied to the data blocks during the linear transformations SR, MC, and AK are the regular masks 119. By contrast, the basis and affine transformations 109, 115, 116 applied by the basis (re) mapper and affine transformer subcomponents 101, 105, 106 also affect this mask 119. The M-O controller 93 therefore receives transformed masks 120, 121.

As illustrated in FIG. 7, the basis re-mapping $T^{-1}$ at mapper subcomponent 105 is merged with the affine transformation A at subcomponent 106 and kept separate from the GF($2^8$) inversion 103.

In this example, the masking 122 and the obfuscation 124 remain static for the entire duration of an encryption computation. The effects of the masking 122 and obfuscation 124 are thus embedded in the circuit 20 before each fresh cryptographic computation commences. The M-O controller 93 and other logic elements used for storing and setting the mask and obfuscation functions remain stable throughout the full computation, implying that no switching events will take place relating to a change of the obfuscation function 124 or the state of the masks 119, 120, 121, thus rendering the circuit 20 more robust against side channel analysis.

In alternative embodiments, the circuit 20 in FIG. 7 (and other circuits described herein) may be configured to operate in a deciphering mode involving decryption of the input blocks—as an alternative or in addition to the enciphering mode. Embodiments that are configured to selectively operate in either one of these modes may reduce their circuit area usage by providing dedicated data paths for the linear transformation parts of the encryption and the decryption modes, but with obfuscated non-linear byte inversion components that are shared by the encryption and decryption modes. Switching such a multi-mode circuit between the encryption and decryption modes may for instance be implemented by multiplexers that are configured to receive encryption/decryption binary toggle signals at their selector ports, and configured to jointly maintain the circuit in the selected mode throughout the entire cryptographic computation while keeping the unused other path gated with the related inputs set to 0.

The present invention may be embodied in other specific forms. The described embodiments are to be considered in all respects only as illustrative and not restrictive. The scope of the invention is, therefore, indicated by the appended claims rather than by the foregoing description. It will be apparent to the person skilled in the art that alternative embodiments of the invention can be conceived and reduced to practice. All changes which come within the meaning and range of equivalency of the claims are to be embraced within their scope, to the extent permitted by national law.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What is claimed is:

1. A method for concurrently executing a first block cryptographic computation and a second block cryptographic computation using a ciphering circuit, the method comprising:

computing, using the first block cryptographic computation, a first output block by executing a plurality of first processing rounds based on a first input block, wherein the first input block is random data;

computing, using the second block cryptographic computation, a second output block by executing a plurality of second processing rounds based on a second input block, wherein the second block cryptographic computation encrypts or decrypts the second input block to generate the second output block; and alternatingly executing respective first and second processing rounds in a round-interleaved sequence.

2. The method of claim 1, wherein the first block cryptographic computation and the second block cryptographic computation are iterated block cryptographic computations, wherein respective first and second intermediate blocks are obtained in an alternating sequence, the method further comprising:

obtaining a plurality of first intermediate blocks, each first intermediate block resulting from a corresponding first processing round and forming an input for a next first processing round;

obtaining a plurality of second intermediate blocks, each second intermediate block resulting from a corresponding second processing round and forming an input for a next second processing round, and obtaining, using the ciphering circuit, respective first and second intermediate blocks in an alternating sequence.

3. The method of claim 2, wherein the ciphering circuit comprises a first block register and a second block register configured to cooperate as a shift register and to store at least two blocks of data, the method further comprising:

alternatingly storing obtained first and second intermediate blocks in the first block register while moving a preceding second or first intermediate block into the second block register so that subsequent first and second intermediate blocks move in an interleaved sequence through the shift register;

initially storing the first input block in the second block register and concurrently storing the second input block in the first block register;

processing the first input block to obtain a first intermediate block, shifting the second input block to the second block register, and storing the first intermediate block in the first block register; and processing the second input block to obtain a second intermediate block, shifting the first intermediate block to the second block register, and storing the second intermediate block in the first block register.

4. The method of claim 1, further comprising, after completing the first and second block cryptographic computations:

storing the first output block obtained from the first block cryptographic computation; and executing a third block cryptographic computation including third processing rounds concurrently with a fourth block cryptographic computation including fourth processing rounds, wherein respective third and fourth processing rounds are alternatingly executed in a further round-interleaved sequence;

wherein the third block cryptographic computation comprises using the first output block as a third input block for computing a third output block.

5. The method of claim 4, wherein the first block cryptographic computation and the second block cryptographic computation are iterated key-alternating block cryptographic computations, the method further comprising:

executing a first key scheduling operation and a second key scheduling operation using a scheduling circuit, wherein the first key scheduling operation comprises partitioning or expanding a first input key into first round keys by iteratively executing a plurality of first key processing cycles, and wherein the second key scheduling operation comprises partitioning or expanding a second input key into second round keys by iteratively executing a plurality of second key processing cycles; and alternatingly executing respective first and second key processing cycles in a cycle-interleaved sequence.

6. The method of claim 5, wherein respective first and second key processing cycles yield corresponding first and second round keys, the method further comprising:

synchronizing the round-interleaved and cycle-interleaved sequences by supplying, by the scheduling circuit, a respective first round key to the ciphering circuit during a respective first processing round as input for obtaining a corresponding first intermediate block, and supplying, by the scheduling circuit, a respective second round key to the ciphering circuit during a respective second processing round as input for obtaining a corresponding second intermediate block.

7. The method of claim 5, wherein the scheduling circuit comprises a first key register and a second key register configured to cooperate as a key shift register, and to store at least two round keys, the method further comprising:

alternatingly storing obtained first and second round keys in the first key register while moving a preceding second or first round key into the second key register so that subsequent first and second round keys move in an interleaved sequence through the key shift register;

initially storing the first input key in the second key register and concurrently storing the second input key in the first key register;

processing the first input key with the scheduling circuit to obtain a first round key, shifting the second input key to the second key register, and storing the first round key in the first key register; and processing the second input key with the scheduling circuit to obtain a second round key, shifting the first round key to the second key register, and storing the second round key in the first key register.

8. The method of claim 5, further including, after completing the first and second key scheduling operations:

storing a first final round key obtained from a final first key processing cycle of the first key scheduling operation; and executing a third key scheduling operation including third key processing cycles concurrently with a fourth key scheduling operation including fourth key processing cycles, wherein respective third and fourth key processing cycles are alternatingly executed in a further cycle-interleaved sequence;

wherein the third key scheduling operation comprises using the first final round key as third input key; and wherein the third block cryptographic computation comprises using the first output block as third input block for partitioning or expanding the third input key into third round keys.

9. The method of claim 4, further comprising:

implementing functional correspondence between input and output of non-linear transformations applied by the ciphering circuit on the first input block during the first block cryptographic computation; and applying dynamical obfuscation to the ciphering circuit by:

selecting, based on contents of the first output block and/or of a first intermediate block produced by the first block cryptographic computation, a subset of the functional correspondences; and re-encoding the functional correspondence into a modified functional correspondence between the input and the output of the non-linear transformations applied on the third input block during the third block cryptographic computation.

10. The method of claim 1, wherein the first block cryptographic computation and the second block cryptographic computation are iterated key-alternating block cryptographic computations in accordance with the advanced encryption standard, AES, wherein each of the first and second input blocks and the first and second output blocks forms a two-dimensional state array composed of data elements ($a_k$) of one byte each, and wherein each round of at least part of the first and second processing rounds involves a byte substitution operation (SB), a row shifting operation (SR), a column mixing operation (MC), and a round key addition operation (AK).

11. The method of claim 10, further comprising:

applying dynamic obfuscation in the byte substitution operation (SB); and applying Boolean masking in the row shifting operation (SR), in the column mixing operation (MC), and in the round key addition operation (AK).

12. The method of claim 1, wherein the second input block includes target input data.

13. The method of claim 1, wherein the random data includes data obtained from a pseudo random number generator.

14. The method of claim 12, wherein the target input data includes plaintext or ciphertext data.

15. A ciphering processor unit, comprising:

at least one memory; and at least one processor coupled to the at least one memory and configured to:

compute, using a first block cryptographic computation, a first output block by executing a plurality of first processing rounds based on a first input block, wherein the first input block is random data; and compute, using a second block cryptographic computation, a second output block by executing a plurality of second processing rounds based on a second input block, wherein the second block cryptographic computation encrypts or decrypts the second input block to generate the second output block, and wherein the at least one processor is configured to alternatingly execute the first block cryptographic computation and the second block cryptographic computation respective first and second processing rounds in a round-interleaved sequence.

16. The ciphering processor unit of claim 15, wherein the first block cryptographic computation and the second block cryptographic computation are iterated block cryptographic computations, wherein respective first and second intermediate blocks are obtained in an alternating sequence, and wherein the at least one processor is configured to:

obtain a plurality of first intermediate blocks, each first intermediate block resulting from a corresponding first processing round and forming an input for a next first processing round; and obtain a plurality of second intermediate blocks, each second intermediate block resulting from a corresponding second processing round and forming an input for a next second processing round, wherein the ciphering processor unit is configured to obtain respective first and second intermediate blocks in an alternating sequence.

17. The ciphering processor unit of claim 16, wherein the ciphering processor unit further comprises a first block register and a second block register configured to cooperate as a shift register and to store at least two blocks of data, and wherein the at least one processor is configured to:

alternatingly store obtained first and second intermediate blocks in the first block register while moving a preceding second or first intermediate block into the second block register so that subsequent first and second intermediate blocks move in an interleaved sequence through the shift register;

initially store the first input block in the second block register and concurrently storing the second input block in the first block register;

process the first input block to obtain a first intermediate block, shifting the second input block to the second block register, and storing the first intermediate block in the first block register; and processing the second input block to obtain a second intermediate block, shifting the first intermediate block to the second block register, and storing the second intermediate block in the first block register.

18. The ciphering processor unit of claim 15, wherein the at least one processor is configured to, after completing the first and second block cryptographic computations:

store the first output block obtained from the first block cryptographic computation; and execute a third block cryptographic computation including third processing rounds concurrently with a fourth block cryptographic computation including fourth processing rounds, wherein respective third and fourth processing rounds are alternatingly executed in a further round-interleaved sequence;

wherein the third block cryptographic computation comprises using the first output block as a third input block for computing a third output block.

19. The ciphering processor unit of claim 18, wherein the first block cryptographic computation and the second block cryptographic computation are iterated key-alternating block cryptographic computations, and wherein the at least one processor is configured to:

execute a first key scheduling operation and a second key scheduling operation using a scheduling circuit, wherein the first key scheduling operation comprises partitioning or expanding a first input key into first round keys by iteratively executing a plurality of first key processing cycles, and wherein the second key scheduling operation comprises partitioning or expanding a second input key into second round keys by iteratively executing a plurality of second key processing cycles; and alternatingly execute respective first and second key processing cycles in a cycle-interleaved sequence.

20. The ciphering processor unit of claim 19, wherein respective first and second key processing cycles yield corresponding first and second round keys, and wherein the at least one processor is configured to:

synchronize the round-interleaved and cycle-interleaved sequences by supplying, by the scheduling circuit, a respective first round key to a ciphering circuit during a respective first processing round as input for obtaining a corresponding first intermediate block, and supplying, by the scheduling circuit, a respective second round key to the ciphering circuit during a respective second processing round as input for obtaining a corresponding second intermediate block.

* * * * *